(12) United States Patent
Sugihara

(10) Patent No.: US 11,487,354 B2
(45) Date of Patent: Nov. 1, 2022

(54) INFORMATION PROCESSING APPARATUS, INFORMATION PROCESSING METHOD, AND PROGRAM

(71) Applicant: SONY CORPORATION, Tokyo (JP)

(72) Inventor: Kenji Sugihara, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/981,055

(22) PCT Filed: Jan. 10, 2019

(86) PCT No.: PCT/JP2019/000419
§ 371 (c)(1),
(2) Date: Sep. 15, 2020

(87) PCT Pub. No.: WO2019/187487
PCT Pub. Date: Oct. 3, 2019

(65) Prior Publication Data
US 2021/0004081 A1 Jan. 7, 2021

(30) Foreign Application Priority Data
Mar. 28, 2018 (JP) .............................. JP2018-061172

(51) Int. Cl.
*G06F 3/01* (2006.01)
*G02B 27/00* (2006.01)
*G02B 27/01* (2006.01)

(52) U.S. Cl.
CPC ......... *G06F 3/013* (2013.01); *G02B 27/0093* (2013.01); *G02B 2027/0178* (2013.01)

(58) Field of Classification Search
CPC ........ G02B 27/0093; G02B 2027/0178; G02B 2027/0187; G06F 3/011; G06F 3/012; G06F 3/013; G06T 19/006
See application file for complete search history.

(56) References Cited

U.S. PATENT DOCUMENTS

| 10,353,482 | B2 * | 7/2019 | Nie ......................... G06F 3/013 |
| 10,845,595 | B1 * | 11/2020 | Sohn ................... G02B 27/0093 |
| 2016/0093105 | A1 * | 3/2016 | Rimon ..................... G06F 3/013 345/633 |
| 2018/0150204 | A1 * | 5/2018 | Macgillivray ...... G06F 3/04842 |
| 2019/0221184 | A1 * | 7/2019 | Higuchi ............. G02B 27/0172 |

FOREIGN PATENT DOCUMENTS

WO WO-2018020661 A * 2/2018 ............. G06T 19/00

* cited by examiner

*Primary Examiner* — Nelson M Rosario
(74) *Attorney, Agent, or Firm* — Paratus Law Group, PLLC

(57) ABSTRACT

There is provided an information processing apparatus, an information processing method, and a program that make it possible to improve usability in information presentation. The information processing apparatus includes a recognition unit configured to recognize a shift in gaze and a move of a head of a user; and a display controller configured to control display of information on a subject according to the move of the head that is made after the gaze is turned to the subject.

16 Claims, 24 Drawing Sheets

FIG.3
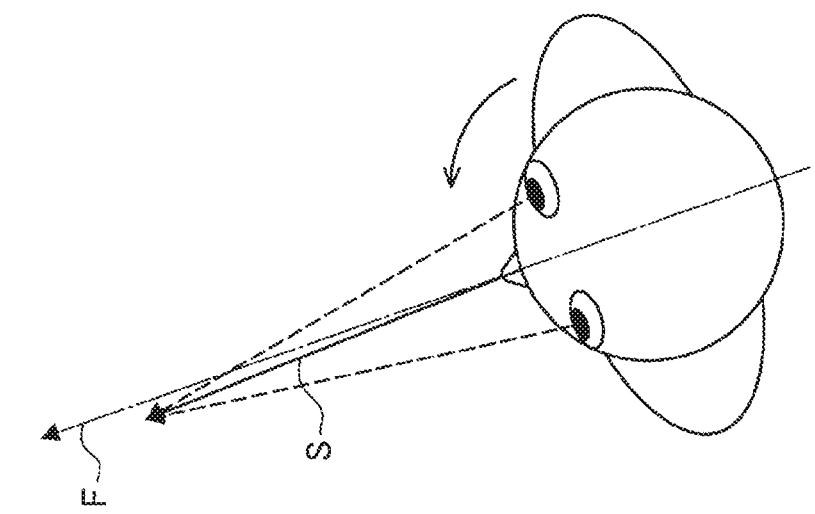
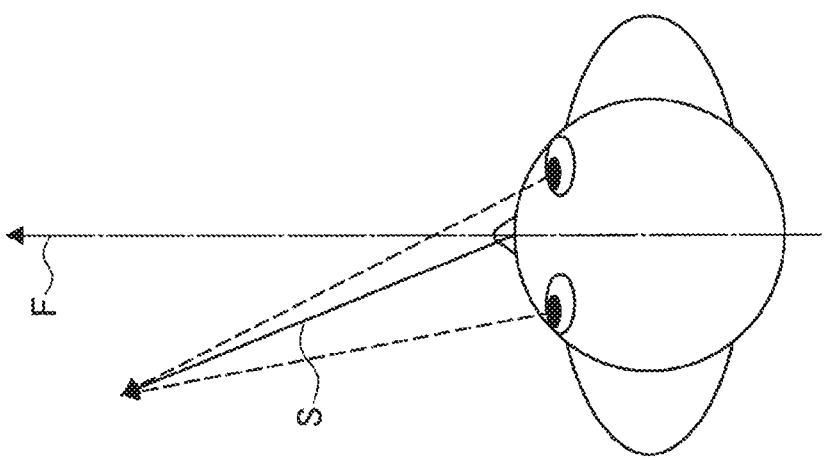
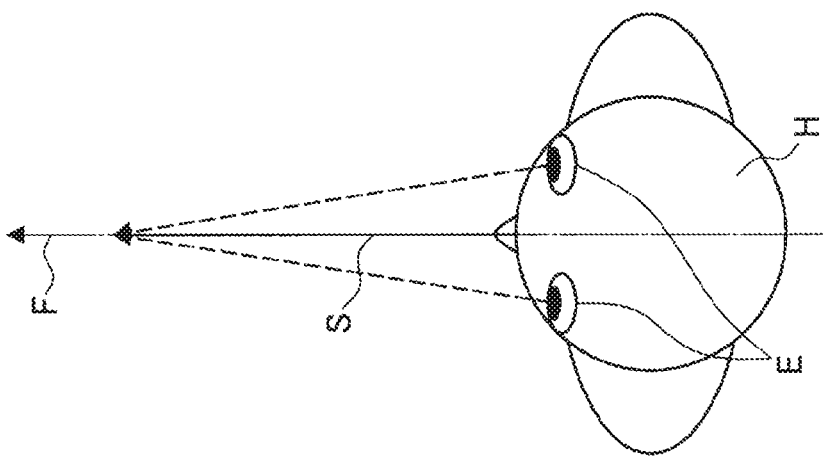

FIG.4
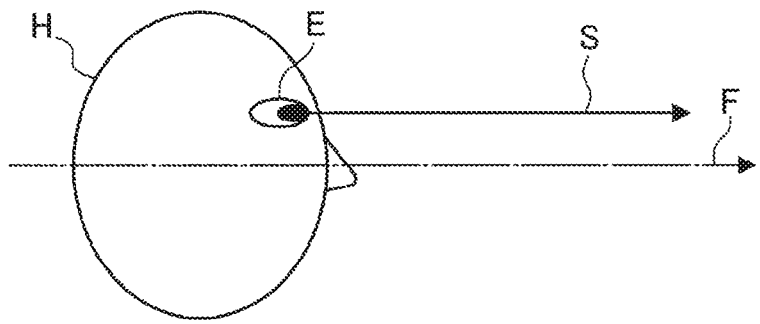
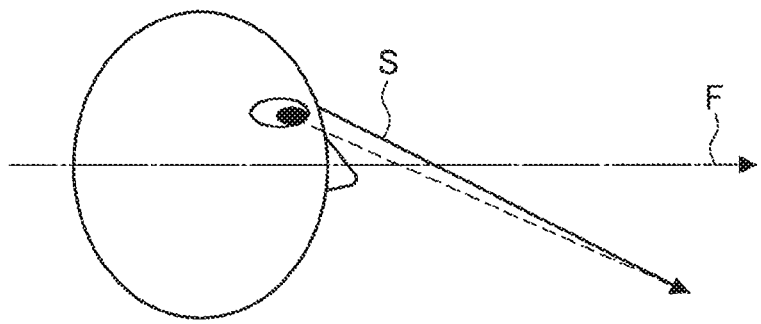
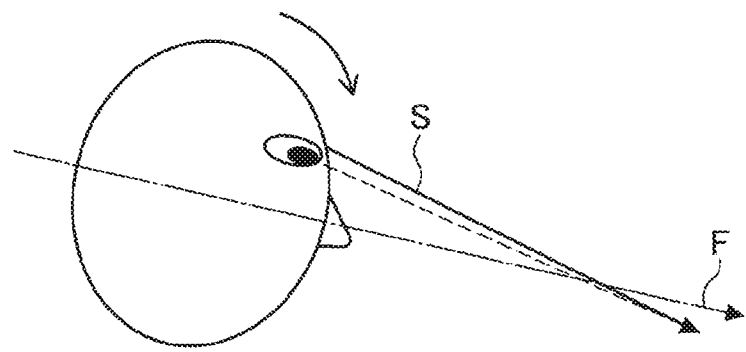

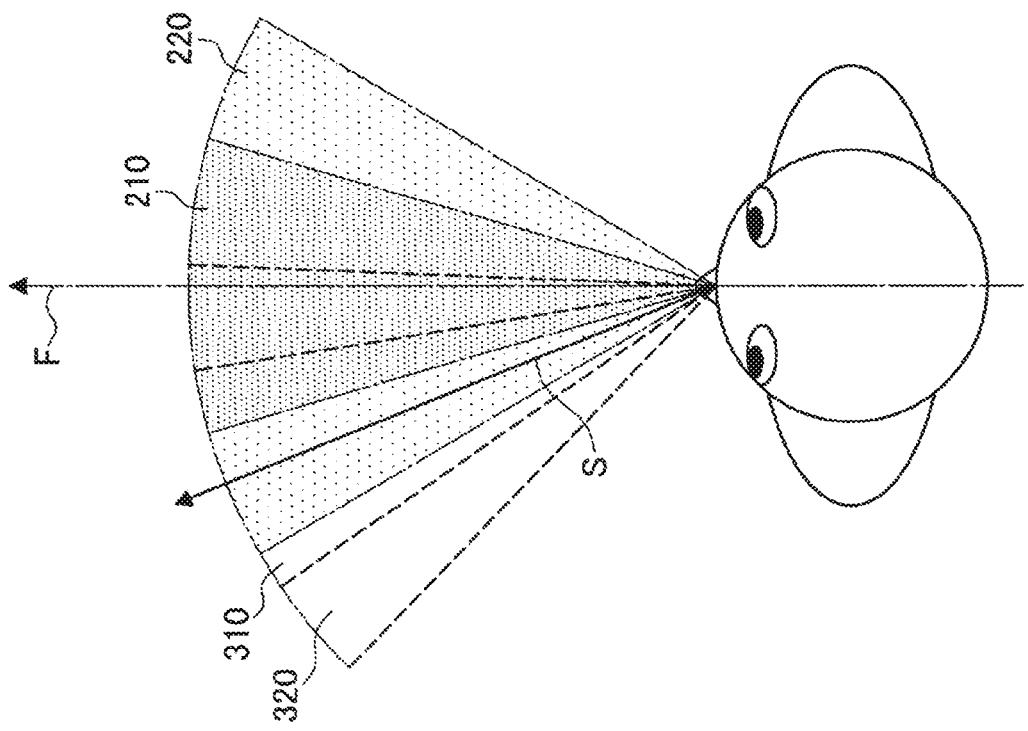
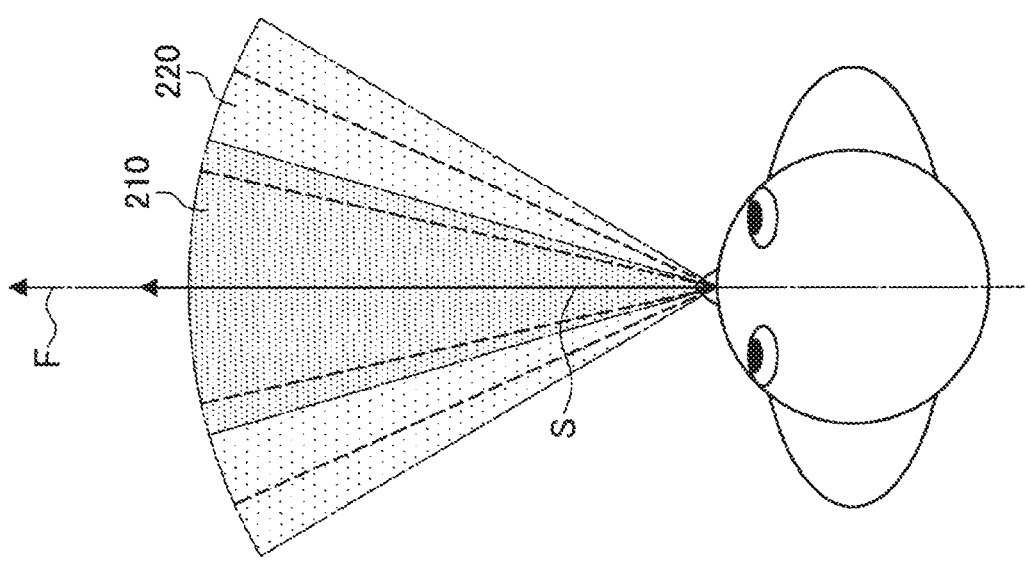
FIG.5

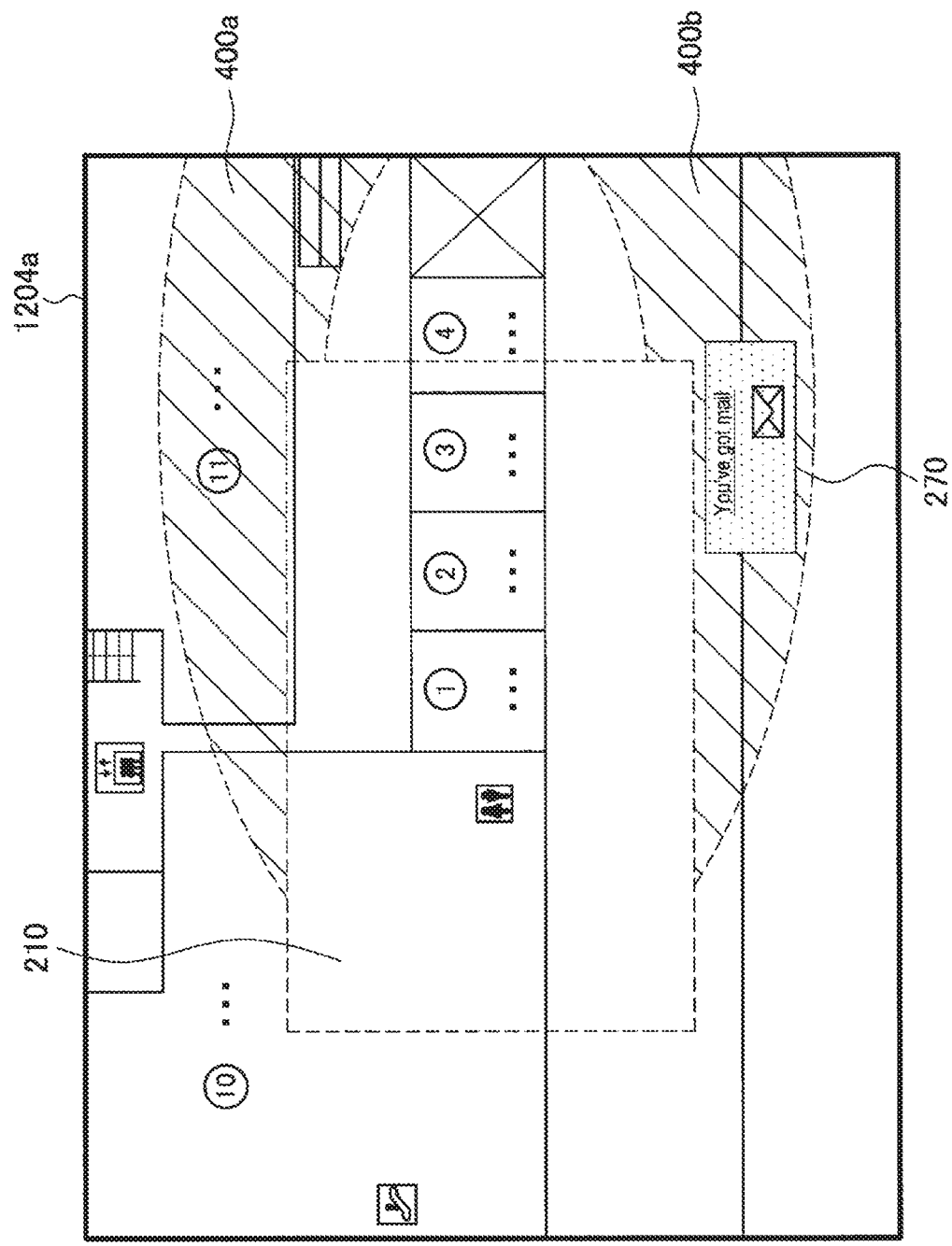

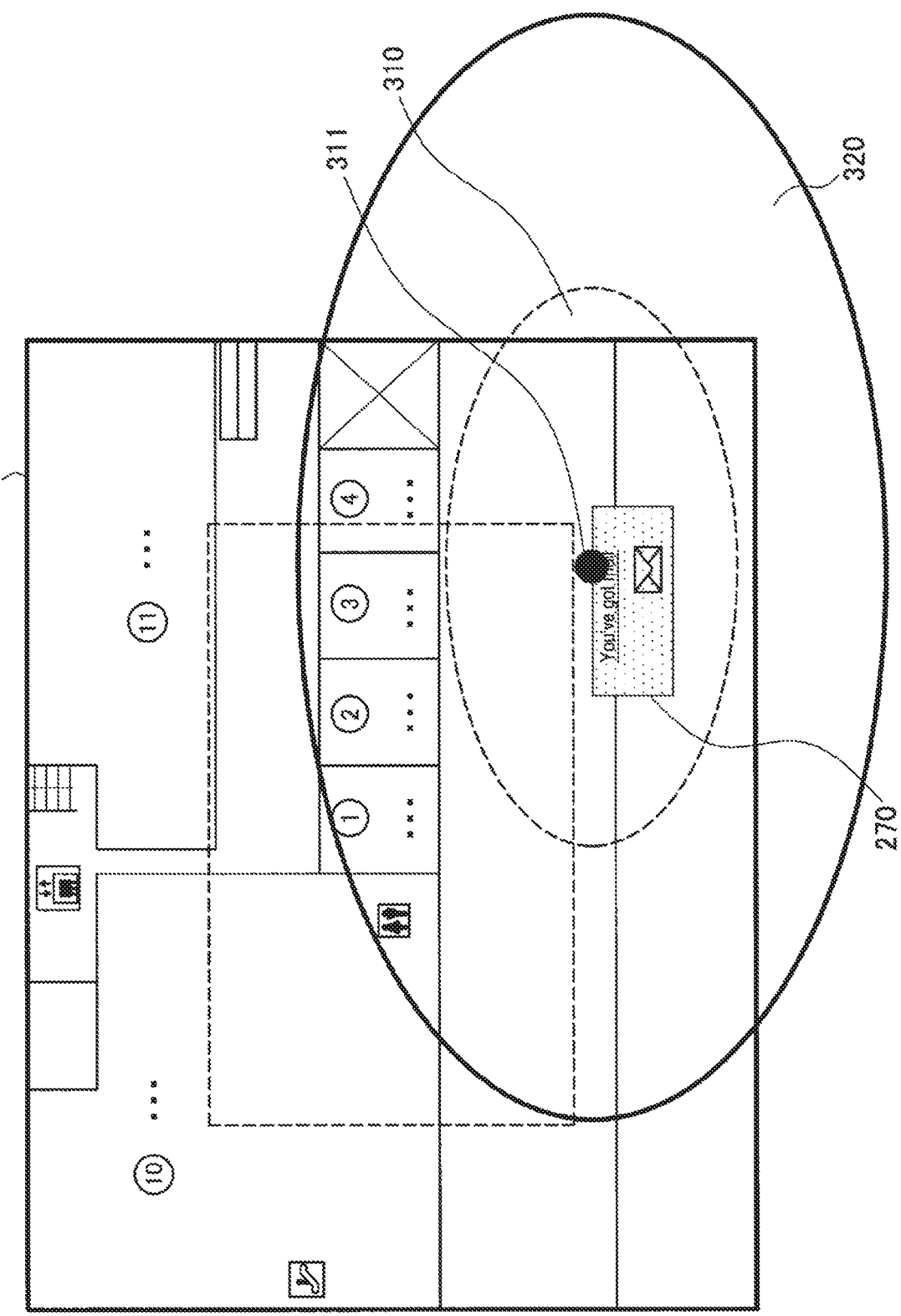

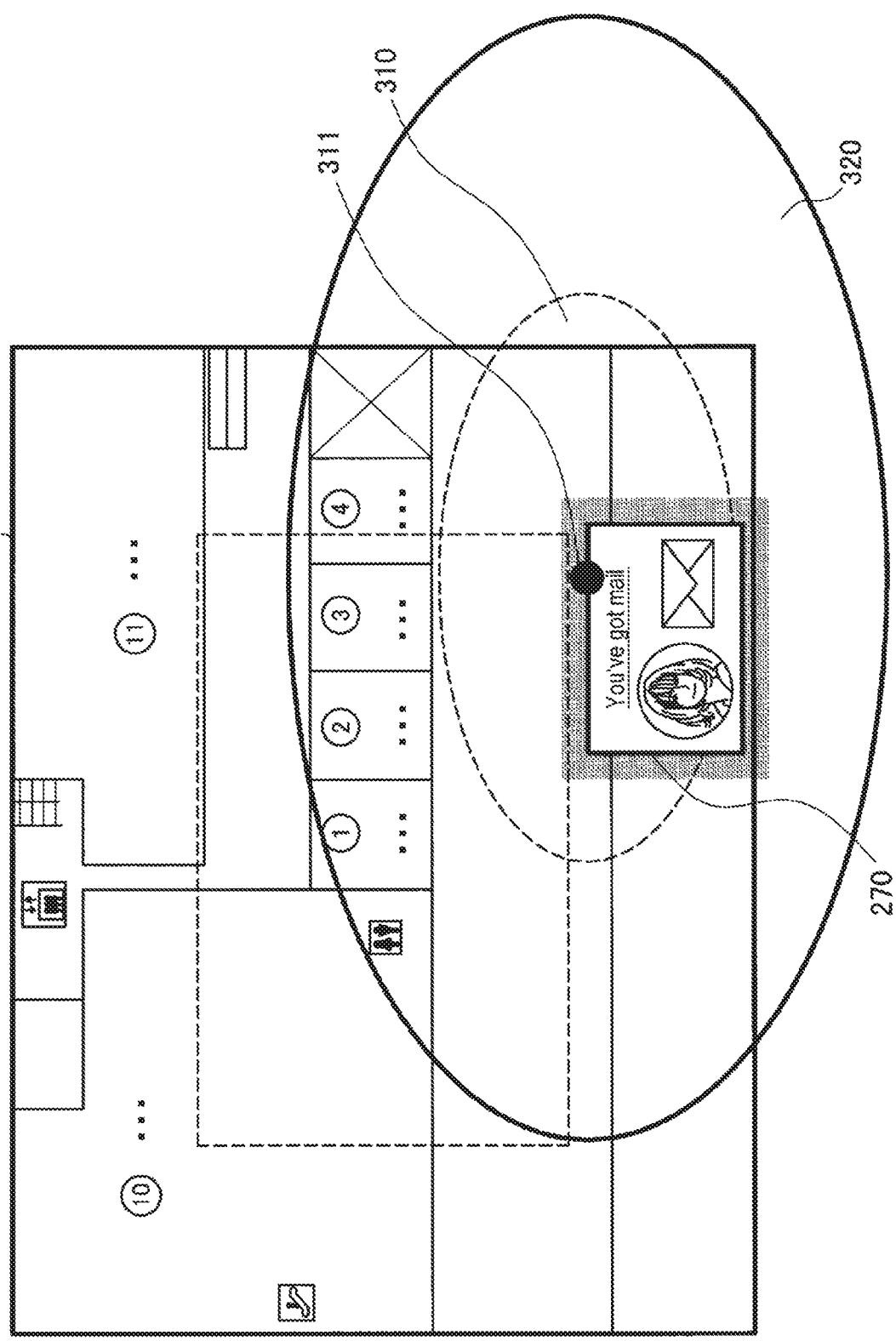

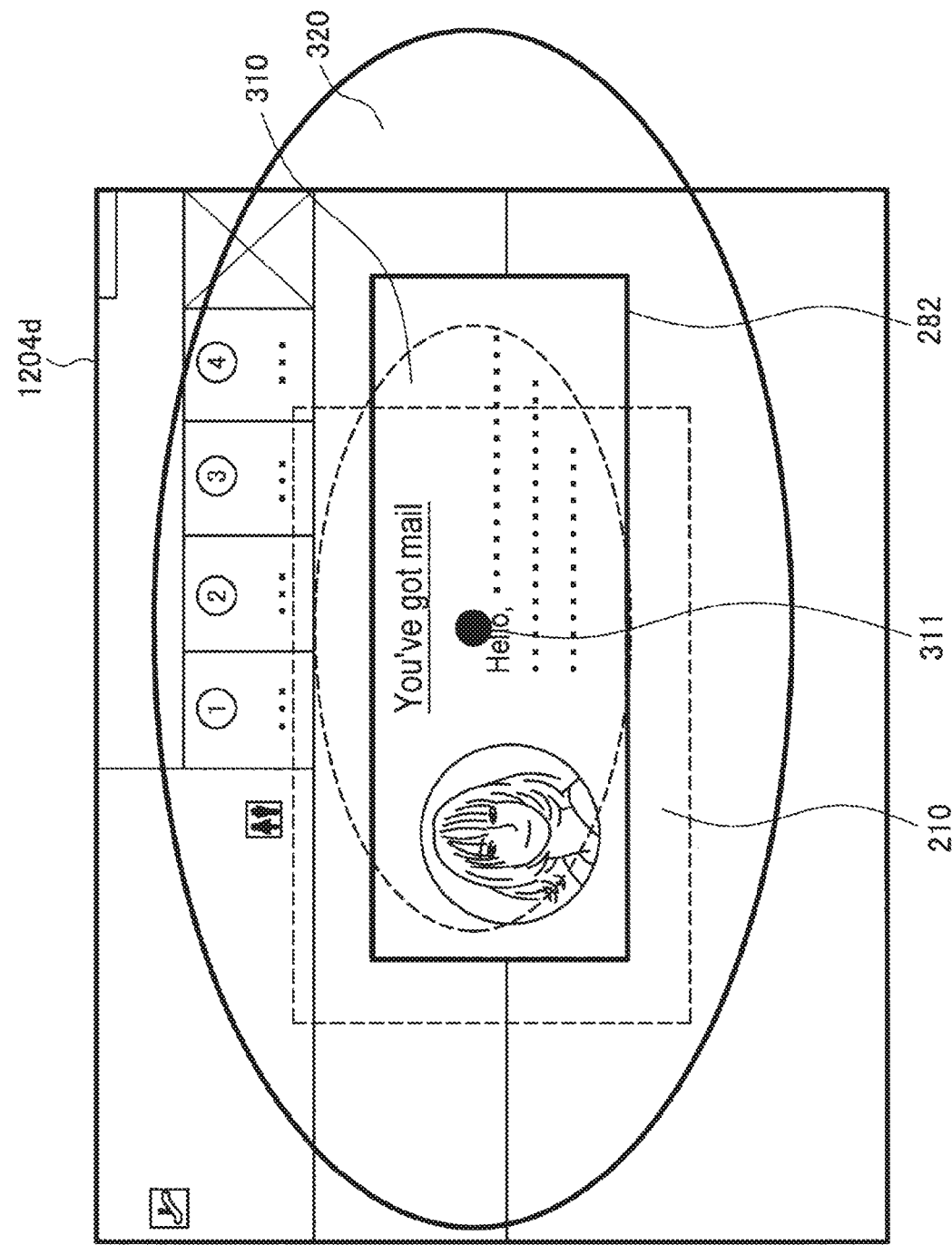

INFORMATION PROCESSING APPARATUS, INFORMATION PROCESSING METHOD, AND PROGRAM

CROSS REFERENCE TO PRIOR APPLICATION

This application is a National Stage Patent Application of PCT International Patent Application No. PCT/JP2019/000419 (filed on Jan. 10, 2019) under 35 U.S.C. § 371, which claims priority to Japanese Patent Application No. 2018-061172 (filed on Mar. 28, 2018), which are all hereby incorporated by reference in their entirety.

FIELD

The disclosure relates to an information processing apparatus, an information processing method, and a program.

BACKGROUND

In recent years, the technology of AR (Augmented Reality) that augments a reality environment that a human perceives by superimposing additional information on a real space has been widely used and information presentation using the AR technology has been performed. In the AR technology, additional information that is presented to a user is also referred to as an annotation that can be visualized using virtual objects in various modes, such as texts, an icon, an image and a 3D model.

For example, Patent Literature 1 discloses a technique of, using a so-called see-through display (transparent display unit), transparently displaying an annotation (virtual object) in a superimposed manner on an image of a real space that a user is viewing. Patent literature 1 describes control to display a display object that is chosen from multiple display object candidates (candidate objects) corresponding to a subject based on gaze information. More specifically, the invention described in Patent Literature 1 calculates a point-of-view position (point of regard) on a display screen from a gaze direction that is specified from the gaze information and chooses a display object to be displayed on the display screen based on the distance between the point-of-view position on the display screen and a calculated position of the subject on the display screen.

CITATION LIST

Patent Literature

Patent Literature 1: International Publication Pamphlet No. WO2017/169400

SUMMARY

Technical Problem

Choosing content using only a line of sight, such as a fixed line of sight, is with a large stress on a user and a line of sight falling on does not necessarily mean that the user has interest and thus there is a risk that false recognition occur.

The aforementioned patent literature describes, as for a gaze detection technique, that a method of detecting a line of sight based on a position of a variable point of an eye with respect to a reference point of the eye, a pupil center corneal reflex method, AAM (Active Appearance Models) to track features, such as the eyes, nose, and mouth of a face, etc., are usable, and the above-described false recognition in gaze detection is not particularly taken into consideration.

The disclosure proposes an information processing apparatus, an information processing method, and a program that make it possible to improve usability in information presentation.

Solution to Problem

According to the present disclosure, an information processing apparatus is provided that includes: a recognition unit configured to recognize a shift in gaze and a move of a head of a user; and a display controller configured to control display of information on a subject according to the move of the head that is made after the gaze is turned to the subject.

According to the present disclosure, an information processing method is provided that includes: by a processor, recognizing a shift in gaze and a move of a head of a user, and controlling display of information on a subject according to the move of the head that is made after the gaze is turned to the subject.

According to the present disclosure, a program is provided that causes a computer to function as a recognition unit configured to recognize a shift in gaze and a move of a head of a user, and a display controller configured to control display of information on a subject according to the move of the head that is made after the gaze is turned to the subject.

Advantageous Effects of Invention

According to the disclosure described above, it is possible to improve usability in information presentation.

The above-described effect is not necessarily restrictive and, together with the above-described effect or instead of the above-described effect, any one of the effects represented herein or another effect that can be known herein can be achieved.

BRIEF DESCRIPTION OF DRAWINGS

FIG. 3 is a user top view to describe gaze directions and head orientations of a user according to the embodiment.

FIG. 4 is a user side view to describe gaze directions and head orientations of the user according to the embodiment.

FIG. 5 is a schematic diagram to describe each region based on a gaze direction and each region based on a head orientation according to the embodiment.

FIG. 21 is a diagram illustrating an example of a simplified display of a mail reception notification according to a modification of the embodiment.

FIG. 22 is a diagram to describe the case where a simplified display is captured in a gaze direction central region according to the modification of the embodiment.

FIG. 23 is a diagram illustrating an example of enhanced display control on a simplified display according to the modification of the embodiment.

FIG. 24 is a diagram illustrating an example of a detailed display according to the modification of the embodiment.

DESCRIPTION OF EMBODIMENTS

With reference to the accompanying drawings, preferable embodiments of the disclosure will be described in detail below. In the description and drawings, components that have substantially the same functional configuration are denoted with the same numbers and redundant description is thus omitted.

Figure 1:
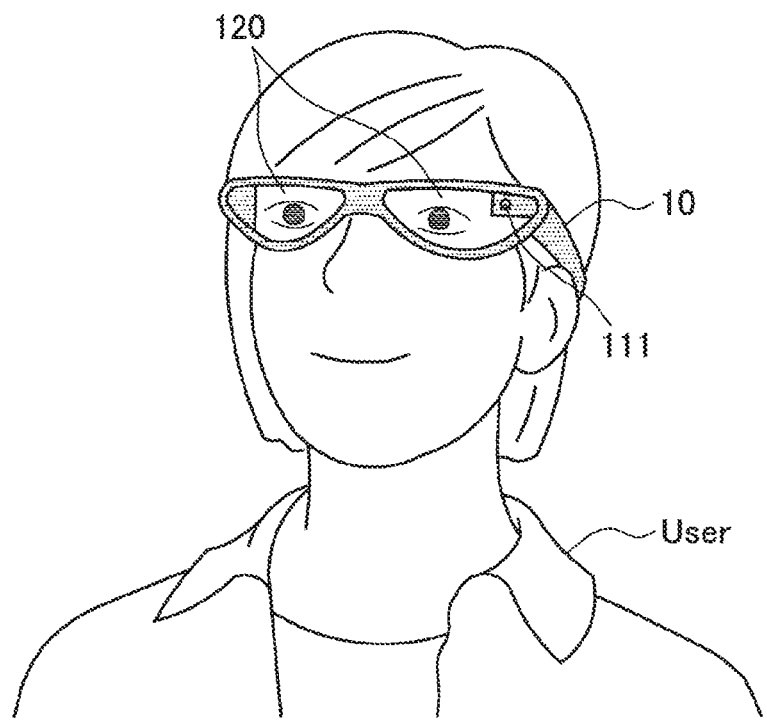
FIG. 1 is a diagram to describe an overview of an information processing apparatus according to an embodiment of the disclosure.

Description will be given in the following order.
1. Overview of Information Processing Apparatus according to Embodiment of Disclosure
2. Configuration
3. Operational Processes
3-1. Display Control Process
3-2. Information presentation Position Determination Process
3-3. Information Presentation Process
4. Modification
5. Summary 1. Overview of Information Processing Apparatus According to Embodiment of Disclosure First of all, an overview of an information processing apparatus according to an embodiment of the disclosure will be described. FIG. 1 is a diagram to describe the overview of an information processing apparatus 10 according to the embodiment. As illustrated in FIG. 1, the information processing apparatus 10 according to the embodiment is implemented with, for example, a glasses-like wearable terminal device (also referred to as a transparent HMD (Head Mounted Display)) that is worn on the head of a user. A display unit 120 that corresponds to the part of the lenses of the glasses and that is positioned in front of the eyes of the user when the information processing apparatus 10 is worn may be a so-called optical see-through display with optical transmissivity. The information processing apparatus 10 is able to present a virtual object within the field of view of the user by displaying a virtual object on the display unit 120. In other words, the information processing apparatus 10 can function as a so-called AR (Augmented Reality) terminal device that displays a virtual object on a transmissive display unit and performs control such that the virtual object is seen in a superimposed manner in a real space, thereby realizing augmented reality. The HMD that is an example of the information processing apparatus 10 is not limited to one that presents an image to both the eyes, and it may be one that presents an image to only one of the eyes. For example, the HMD may be of a single-eye type provided with the display unit 120 that presents an image to one of the eyes.

The information processing apparatus 10 may be provided with an outward camera 111 that captures an image in a direction in which the face of the user is oriented (that is, a head orientation) when the information processing apparatus 10 is worn. Furthermore, although not illustrated in FIG. 1, the information processing apparatus 10 may be provided with various sensors, such as a gaze sensor 112 that detects a light of sight of the user when the information processing apparatus 10 is worn and a microphone (hereinafter, "mic") 113. As for the outward camera 111, multiple cameras may be provided.

The shape of the information processing apparatus 10 is not limited to the example illustrated in FIG. 1. For example, the information processing apparatus 10 may be a HMD of a head-band type (a type in which the information processing apparatus 10 is worn with a band around the head, or a band passing through not only the parietal region of the head but also the temporal region of the head) or a HMD of a helmet type (in which the visor of a helmet corresponds to the display unit 120).

When the display unit 120 has optical transmissivity, the user is able to view information that is displayed on the display unit 120 while viewing the real space through the display unit 120. It can be thus described that a virtual object that is displayed on the display unit 120 is displayed in the real space.

Furthermore, control that makes the user feel as if a virtual object exists in the real space can be performed. For example, controlling arrangement and the shape of a virtual object can be performed based on information on the real space that is obtained by image capturing performed by the outward camera 111, for example, information on the position and shape of a real object that exists in the real space.

Virtual objects to be displayed on the display unit 120 can be various. For example, the virtual object may be a virtual object representing various sets of content that is depended on an application that is provided by the information processing apparatus 10 (information on a real object and notification information from the application).

BACKGROUND

When information is presented to a user by displaying a virtual object on the display unit 120, choosing content using only a line of sight, such as a fixed line of sight, is with a large stress on the user and a line of sight falling on does not necessarily mean that the user has interest and thus there is a risk that false recognition occur.

In general, the field of view of a human is in approximately 120 degrees and characteristics of the field of view can be, for example, categorized as follows.

Central vision: an area where the shape and color of an object and a character can be clearly identified, which is an area of approximately 1 to 2 degrees from the point of regard that is focused on (in other words, "from the fovea centralis). The area of the central vision includes an area that is referred to as a "discrimination vision" and a "word identification limit".

Effective vision: an area around the central vision where the shape of an object can be recognized approximately clearly, which is an area of approximately 4 to 20 degrees from the point of regard.

Peripheral vision: an area excluding the central vision and the effective vision where a character and the shape and color of an object cannot be clearly identified but a motion, such as an animation display of a virtual object, can be noticed.

To clearly identify a virtual object that is presented in the peripheral vision or a real object that is seen (captured) in the peripheral vision, the user moves the eyeballs and puts the point of regard on a subject to capture the subject approximately at the center of the field of view, so that the subject is within the area of approximately 1 to 20 degrees from the fovea centralis. The area of approximately 1 to 20 degrees from the fovea centralis is also referred to as a "focal vision". In this case, the central vision (the area of approximately 1 to 2 degrees from the fovea centralis) is referred to as a "vicinity central region".

It is assumed that, when the user identifies the subject and is interested in the subject, the user turns his/her face (that is, turns the head) to the subject and looks into the subject.

Overview of Embodiment

In view of such circumstances, the embodiment of the disclosure was produced. In the embodiment, when a user turns not only the gaze but also the head to a subject, it is determined that the user is highly likely interested in the subject and display control in which detailed information on only the subject the user has interest is presented is performed. This makes it possible to improve usability in presenting information. Note that a "subject" herein may be any one of a real object or a virtual object.

Specific Content of Process of Embodiment

When the gaze of the user is turned to a real object, the information processing apparatus 10 according to the embodiment presents simplified information on the real object that is a subject (that is an example of a virtual object and is also referred to as a "simplified display") and, when the gaze of the user is turned to the simplified display, the information processing apparatus 10 displays the simplified display in an enhanced manner. Furthermore, when not only the gaze of the user but also the head of the user are turned (the face is turned) to the simplified display that is displayed in an enhanced manner, the information processing apparatus 10 understands that the user has interest actually and performs display control in which a detailed display about the real object is presented. The display control in which a detailed display is presented may switch the simplified display that is already presented to a detailed display or display detailed information to be added to the simplified display, which is already presented, in the vicinity.

In the case where, when a simplified display (that is an example of a virtual object that is a subject) of information based on various sets of content dependent on an application that the information processing apparatus 10 provides, such as notification information, is presented, the gaze of the user is turned to the simplified display, the information processing apparatus 10 according to the embodiment displays the simplified display in an enhanced manner. Furthermore, when the gaze of the user as well as the head of the user is turned (the face is turned) to the simplified display that is displayed in an enhanced manner, the information processing apparatus 10 understands that the user has interest actually and performs display control in which a detailed display is presented. The display control in which a detailed display is presented may switch a simplified display that is already presented to a detailed display or display detailed information to be added to a simplified display that is already presented in the vicinity.

Effect of Embodiment

As described above, in the embodiment, performing display control stepwise on the display mode and information granularity of information on a subject based on timing of a shift in gaze and a move of the head of the user makes it possible to improve usability in information presentation.

Turning the gaze and the head to a subject in which a user is interested is a natural behavior and therefore the user is able to unconsciously enables an operation of choosing a subject in which the user is interested without being conscious of explicit choosing and determining motions, which reduces the stress on the user when choosing content using only a line of sight, such as a fixed line of sight. The embodiment makes it possible to see the intention of the user and represent neither too much nor too little information that the user wants to know more smoothly.

A configuration of and an operational process performed by the information processing apparatus 10 according to the embodiment with such an effect will be described more in detail below.

2. Configuration

Figure 2:
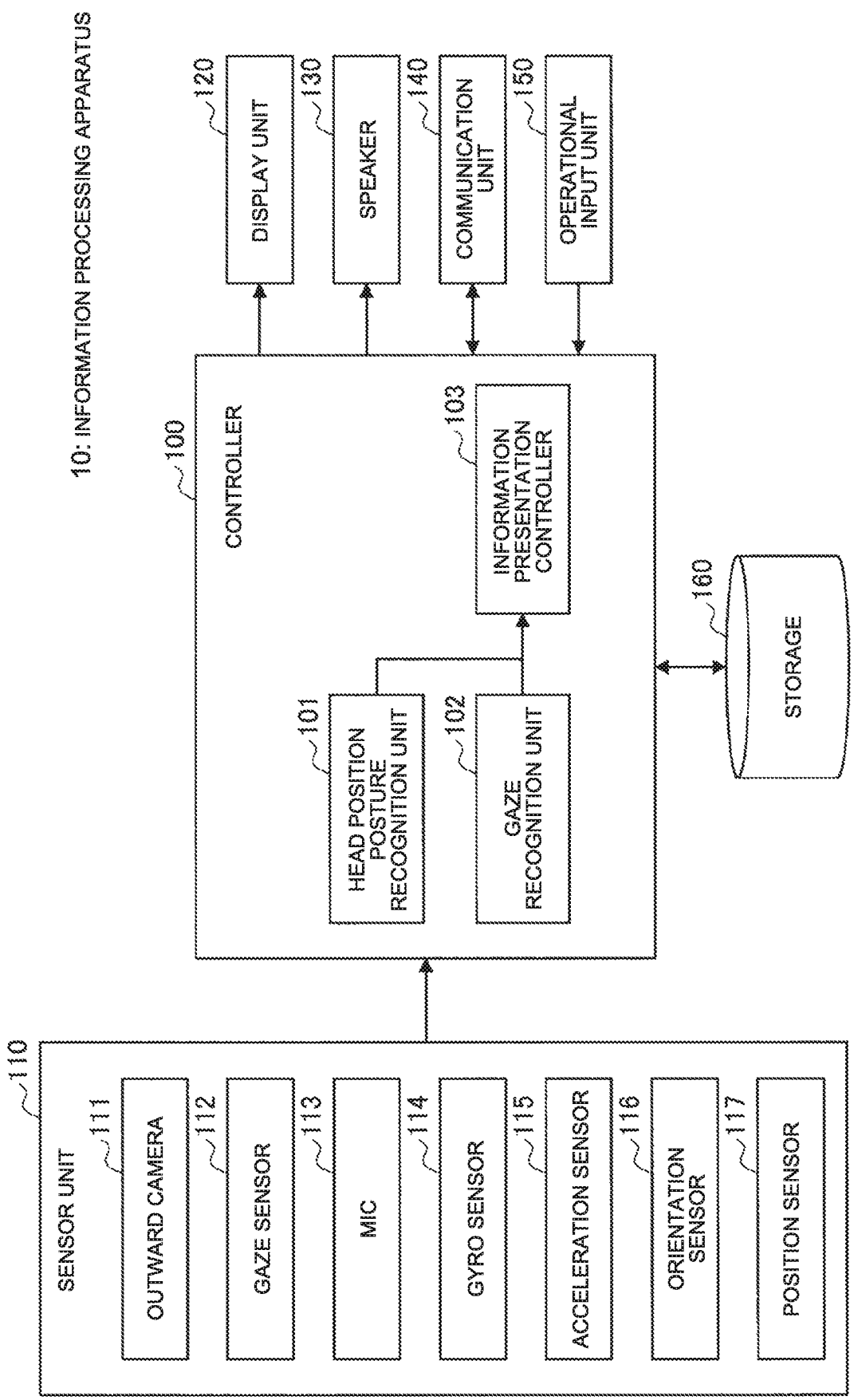
FIG. 2 is a block diagram illustrating an example of a configuration of the information processing apparatus according to the embodiment.

FIG. 2 is a block diagram illustrating an example of the configuration of the information processing apparatus 10 according to the embodiment. As illustrated in FIG. 2, the information processing apparatus 10 includes a sensor unit 110, a controller 100, the display unit 120, a speaker 130, a communication unit 140, an operational input unit 150, and a storage 160.

2-1. Sensor Unit 110

The sensor unit 110 has a function of acquiring (sensing) various types of information on the user or a surrounding environment. For example, the sensor unit 110 includes the outward camera 111, the gaze sensor 112, the mic 113, a gyro sensor 114, an acceleration sensor 115, an orientation sensor 116, and a position sensor 117. The specific example of the sensor unit 110 that is taken herein is an example only and the embodiment is not limited to this. For example, the sensor unit 110 may include a biological sensor, an inward camera, or the like. Each sensor may include multiple sensors.

The outward camera 111 includes each of a lens system formed of an imaging lens, an aperture, a zoom lens, a focus lens, etc., a drive system that causes the lens system to perform a focusing operation and a zooming operation, a solid-state image sensor array that performs photoelectric conversion on an imaging light that is obtained by the lens system and generates an imaging signal, etc. The solid-state image sensor array may be implemented using, for example, a CCD (Charge Coupled Device) sensor array, or a CMOS (Complementary Metal Oxide Semiconductor) sensor array.

In the embodiment, it is preferable that an angle and an orientation of the outward camera 111 be set such that the outward camera 111 captures images in the head orientation (the direction of the orientation of the face) of the user in the real space when the information processing apparatus 10 is worn. Multiple outward cameras 111 may be provided. The outward camera 111 may include a depth camera capable of acquiring a depth map by sensing.

The gaze sensor 112 has a function of detecting a gaze direction of the user when the information processing apparatus 10 is worn. The gaze sensor 112 is, for example, a camera, an infrared sensor, or an ophthalmic potential sensor. Using the sensor data that is sensed by the gaze sensor 112, a gaze recognition unit 102 to be described below acquires gaze information, such as a gaze direction and the point of regard of the user.

The mic 113 picks up voices of the user and environmental sounds around and outputs the voices and sounds as audio data to the controller 100.

The gyro sensor 114 is implemented using, for example, a three-axis gyro sensor and detects an angular velocity (rate of rotation).

The acceleration sensor 115 is implemented using, for example, a three-axis acceleration sensor and detects an acceleration during a move.

The orientation sensor 116 is implemented using, for example, a three-axis geomagnetic sensor (compass) and detects an absolute direction (orientation).

The position sensor 117 has a function of sensing the current position of the information processing apparatus 10 based on an acquisition signal from the outside. Specifically, for example, the position sensor 117 is implemented using a GPS (Global Positioning System) position sensor and the position sensor 117 receives radio waves from GPS satellites, senses the position in which the information processing apparatus 10 is present, and outputs information of the sensed position to the controller 100. The position sensor 117 may sense the position by, other than GPS, for example, W-Fi (trademark), Bluetooth (trademark), communication with a mobile phone, a PHS, or a smartphone, or near field communication.

2-2. Controller 100

The controller 100 functions as an arithmetic processor and a control device and controls entire operations in the information processing apparatus 10 according to various programs. The controller 100 is implemented using an electronic circuit, such as a CPU (central processing unit) or a microprocessor. The controller 100 may include a ROM (Read Only Memory) that stores programs and arithmetic operation parameters to be used, etc., and a RAM (Random Access Memory) that temporarily stores parameters that change as appropriate, etc. The controller 100 according to the embodiment has various recognition functions and a display control function.

2-2-1. Recognition Function

As illustrated in FIG. 2, the controller 100 can function as a head position posture recognition unit 101 and the gaze recognition unit 102.

Head Position Posture Recognition Unit 101

The head position posture recognition unit 101 has a function of acquiring information on the position and posture of the head of the user based on various types of sensor information sensed by the sensor unit 110 (sensing result). The information on the position and posture of the head contains the head orientation (the orientation of the face). For example, the head position posture recognition unit 101 is capable of detecting the orientation of the head from the result of detection by the outward camera 111, the gyro sensor 114, the acceleration sensor 115, and the orientation sensor 116. The position of the head may be information of a three-dimensional position in the real space. In the embodiment, an angle of view and an orientation may be set such that the direction in which image capturing performed by the outward camera 111, which is arranged in the information processing apparatus 10 that is worn on the head of the user, is approximately the same as the head orientation (the direction of the orientation of the face) (or is within a given area based on the head orientation) when the information processing apparatus 10 is worn and, based on an image that is captured by the outward camera 111, the imaging direction (camera optical axis) may be regarded as the head orientation. Alternatively, the head orientation may be the orientation of the information processing apparatus 10 (HMD) mounted on the head of the user, which is an orientation detected based on the result of detection by the outward camera 111, the gyro sensor 114, the acceleration sensor 115, and the orientation sensor 116.

Gaze Recognition Unit 102

The gaze recognition unit 102 has a function of acquiring information on the line of sight of the user based on various types of sensor information (sensing result) sensed by the sensor unit 110. For example, the gaze recognition unit 102 is capable of detecting gaze information containing the point of regard and the gaze direction based on eyeball moves (of both or one of the eyes) from the result of detection by the gaze sensor 112. As a method of detecting a line of sight (detecting an eyeball orientation) based on the eyeball move used herein, for example, a method of detection from a result of detection by an ophthalmic potential sensor, a method of detection by applying an infrared ray (IR) to an eyeball and sensing the light reflected (such as a pupil center corneal reflex method or a sclera reflection method) or a method of detection based on a reference point (the inner corner or corneal reflex) and the position of a point of move (such as an iris, pupil, or the like) is usable.

The point of regard of the user may be information of a three-dimensional position in a real space or information of a two-dimensional position in a captured image of a real space obtained by image capturing by the outward camera 111. The two-dimensional position in the captured image of the real space is, for example, an intersection between a straight line of the gaze direction that is specified from the gaze information and the captured image.

Gaze Direction and Head Orientation

As described above, in the embodiment, recognition of the gaze direction based on move of the eyeballs and recognition of the head orientation based on the position and posture of the head can be performed. Using FIG. 3 and FIG. 4, a gaze direction S and a head orientation F that are recognized in the embodiment will be described. FIG. 3 is a user top view to describe gaze directions S and head orientations F according to the embodiment. FIG. 4 is a user side view to describe gaze directions S and head orientations F according to the embodiment. As illustrated in FIGS. 3 and 4, for example, a gaze direction S is recognized as a straight direction to a point of regard (focus) based on the orientation of an eyeball E (both or one of the eyeballs) of the user from a point between both the eyes (for example, the glabella) (for example, the direction from the center of an eyeball to the center of the iris). As illustrated in FIGS. 3 and 4, for example, the head orientation F is recognized as a direction in which the center of the face of the user is oriented. Alternatively, the head orientation F may be estimated from the orientation of the information processing apparatus 10 that is a HMD worn on the user or the camera optical axis of the outward camera 111 that is provided in the information processing apparatus 10 (including the case where the orientation of the information processing apparatus 10 or the camera optical axis of the outward camera 111 is regarded as the head orientation F).

The gaze direction S according to the embodiment is based on the orientation of an eyeball and the head orientation F is based on the orientation of the head and thus, when the user faces the front, as illustrated on the left in FIG. 3 or the top in FIG. 4, the head orientation F and the gaze direction S coincide; however, when the user shifts the look horizontally or vertically, a phenomenon in which the head orientation F and the gaze direction S shift occurs as illustrated at the center in FIG. 3 or in the middle in FIG. 4. Moving the head in the direction in which the look is shifted causes the head orientation F and the gaze direction to be approximately the same direction.

Three-Dimensional Space Recognition

The controller 100 is able to perform surrounding space recognition based on various types of sensor information sensed by the sensor unit 110 (sensing result). For example, the controller 100 may recognize the real space around the user three-dimensionally based on the captured image of the real space obtained by image capturing performed by the outward camera 111 and furthermore recognize a real object that is present in the real space. When the outward camera 111 includes multiple cameras, the three-dimensional recognition of the real space performed by the controller 100 may be performed using a depth map that is obtained by performing stereo matching on multiple captured images obtained with the cameras. The three-dimensional recognition of the real space performed by the controller 100 may be performed by, based on chronological captured images, associating features that are detected from the captured images between frames. When the outward camera 111 includes a depth camera, the three-dimensional recognition of the real space may be performed based on a distance image that is obtained by sensing with the depth camera.

The controller 100 may recognize the shapes of real objects. The shapes of the real objects that are recognized by the controller 100 may be three-dimensional shapes in the real space or may be two-dimensional shapes in a captured image. The three-dimensional shapes of the real objects in the real space may be recognized by separating each real object, for example, based on the result of three-dimensional recognition of the real space. The two-dimensional shapes of real objects in a captured image may be recognized using, for example, a known segmentation technique.

2-2-2. Display Control Function

As illustrated in FIG. 2, the controller 100 can function as an information presentation controller 103.

Information Presentation Controller 103

The information presentation controller 103 controls display performed by the display unit 120 with optical transmissivity to display a virtual object in the real space. Virtual objects to be caused to be displayed by the information presentation controller 103 are various and the information presentation controller 103 may, for example, cause information on the above-described subject (a real object or a virtual object) or notification information based on the application to be displayed.

The information presentation controller 103 controls the position and posture of a virtual object to be displayed. For example, the information presentation controller 103 controls the position and posture of the virtual object in association with the positions of real objects (two-dimensional positions or three-dimensional positions) based on the result of three-dimensional space recognition.

The information presentation controller 103 may perform virtual object display control based on a gaze direction of the user. For example, the information presentation controller 103 may display a virtual object such that the virtual object is positioned in the peripheral vision according to the point of regard of the user.

The information presentation controller 103 may perform virtual object display control based on the head orientation of the user. For example, the information presentation controller 103 may display the virtual object such that the virtual object is positioned in a peripheral region based on the head orientation.

As described above, the information presentation controller 103 is capable of performing display control including a virtual object display mode and display granularity (the volume of information, simplifying the content of information, detailed display, etc.,) stepwise based on timing of a shift in gaze and a move of the head of the user. In the embodiment, this makes it possible to improve usability in information presentation. Details of the display control will be described below with reference to FIGS. 9 to 24.

Figure 6:
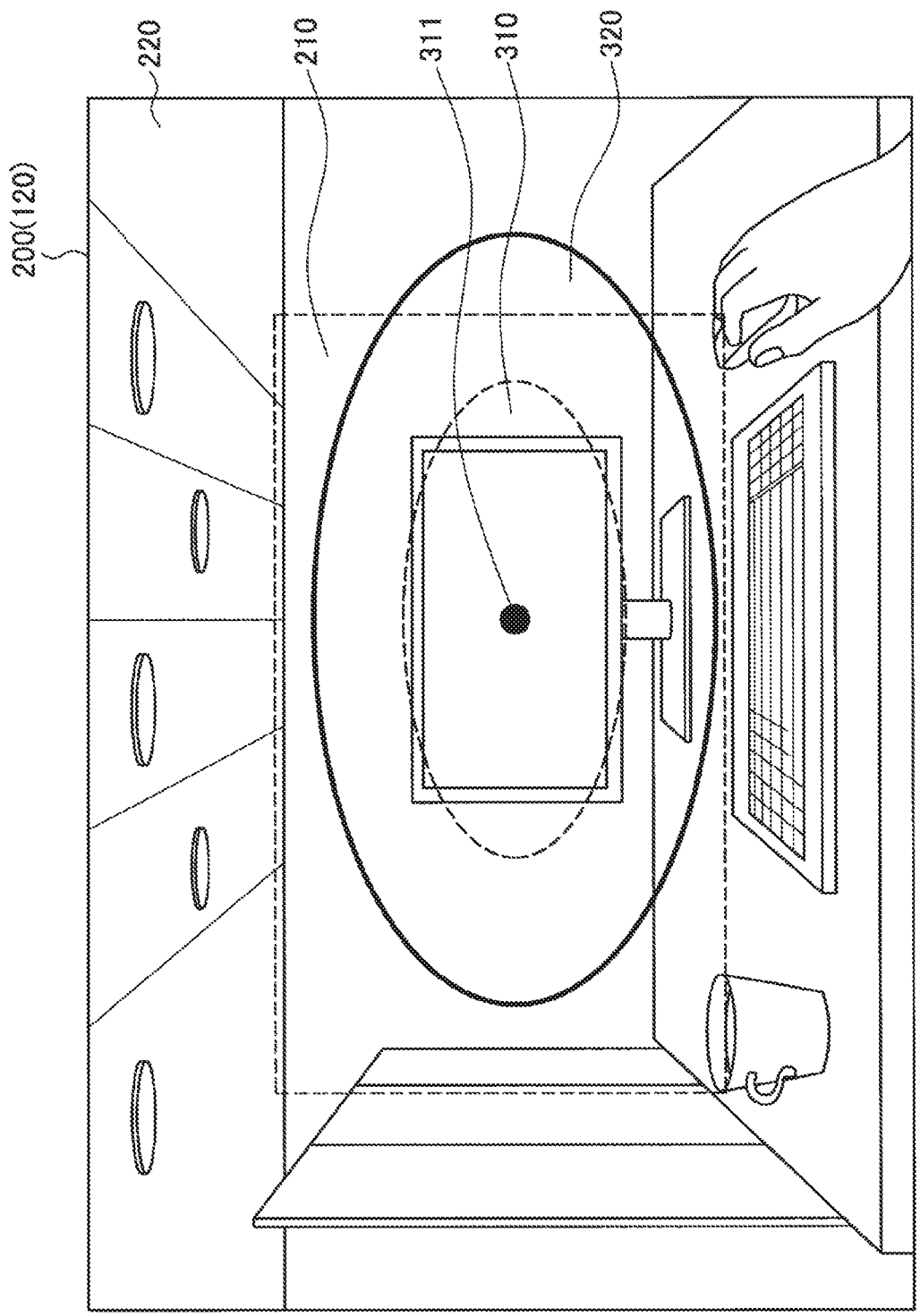
FIG. 6 is a diagram to describe each region based on a gaze direction and each region based on a head orientation in a captured image that is captured by an outward camera according to the embodiment.

Setting each region based on a gaze direction and each region based on a head orientation that are used by the information presentation controller 103 according to the embodiment to perform virtual object display control according to a shift in gaze and a move of the head of the user will be described with reference to FIGS. 5 and 6. FIG. 5 is a schematic diagram to describe each region based on a gaze direction and each region based on a head orientation according to the embodiment. FIG. 6 is a diagram to describe each region based on a gaze direction and each region based on a head orientation in a captured image that is captured by the outward camera 111.

In the embodiment, as illustrated in FIG. 5, a central region of a region based on the head orientation F is referred to as a head orientation central region 210 and the peripheral region thereof (outside the central region) is referred to as a head orientation peripheral region 220. A central region of a region based on the gaze direction S is referred to as a gaze direction central region 310 and the peripheral region thereof (outside the central region) is referred to as a gaze direction peripheral region 320. As illustrated in FIG. 6, when a captured image 200 that is captured by the outward camera 111 is viewed, the gaze direction central region 310 and the gaze direction peripheral region 320 are set around a point of regard 311 based on the gaze direction S of the user. In the captured image 200, because the angle of view is around the head orientation F, the central region of the region (angle of view) of the captured image 200 corresponds to the head orientation central region 210 and the surroundings thereof correspond to the head orientation peripheral region 220.

The border area may be managed by angle as illustrated in FIG. 5 or may be managed by coordinates on the captured image 200. The captured image 200 illustrated in FIG. 6 corresponds to the field of view in the real space that is viewed via the display unit 120 with optical transmissivity when the user faces the front (when the gaze direction and the head orientation coincide). It can be thus described that, in the example illustrated in FIG. 6, the border area is managed by coordinates on the display screen of the display unit 120 with optical transmissivity.

The gaze direction central region 310 is a certain area around the gaze direction S. Based on human factors engineering, the gaze direction central region 310 may be, for example, an area of a normal central viewing area (for example, as described above, the area of approximately 1 to 20 degrees from the fovea centralis). The area may be customized according to the use and scene, such as a display viewing angle of the display unit 120 or the size of a subject.

The gaze direction peripheral region 320 is a region of a certain area around the gaze direction S and is a region not belonging to the central region (around the central region). The gaze direction peripheral region 320 may be an area of a general peripheral vision region (for example, as described above, the area of the human vision of approximately 120 degrees excluding the central vision and the effective vision) based on human factors engineering. The area may be customized according to the use and scene, such as the display viewing angle of the display unit 120 or the size of a subject.

The head orientation central region 210 is a region of a certain area around the head orientation F (the area within the display viewing angle of the display unit 120). The head orientation peripheral region 220 is a region of a certain area around the head orientation F and is a region not belonging to the central region (around the central region). The area of each region can be customized according to the use and scene, such as the display viewing angle of the display unit 120.

As described above, the parameters of the gaze direction central region 310, the gaze direction peripheral region 320, the head orientation central region 210, and the head orientation peripheral region 220 can be set as appropriate. In the example illustrated in FIG. 6, the region around the gaze direction (the point of regard 311) is smaller than the region around the head orientation (the center of the screen) (that is, the display viewing angle); however, the embodiment is not limited thereto. For example, the area of the head orientation central region 210 may be set at the same area (size) as the central vision (the gaze direction central region 310) at the time when the head orientation F coincides with the gaze direction S and the area of the head orientation peripheral region 220 may be set at the same area (size) as the peripheral vision (the gaze direction peripheral region 320) at the time when the head orientation F coincides with the gaze direction S. Alternatively, the case where the region around the gaze direction (the point of regard 311) is larger than the display viewing angle is assumed.

Figure 7:
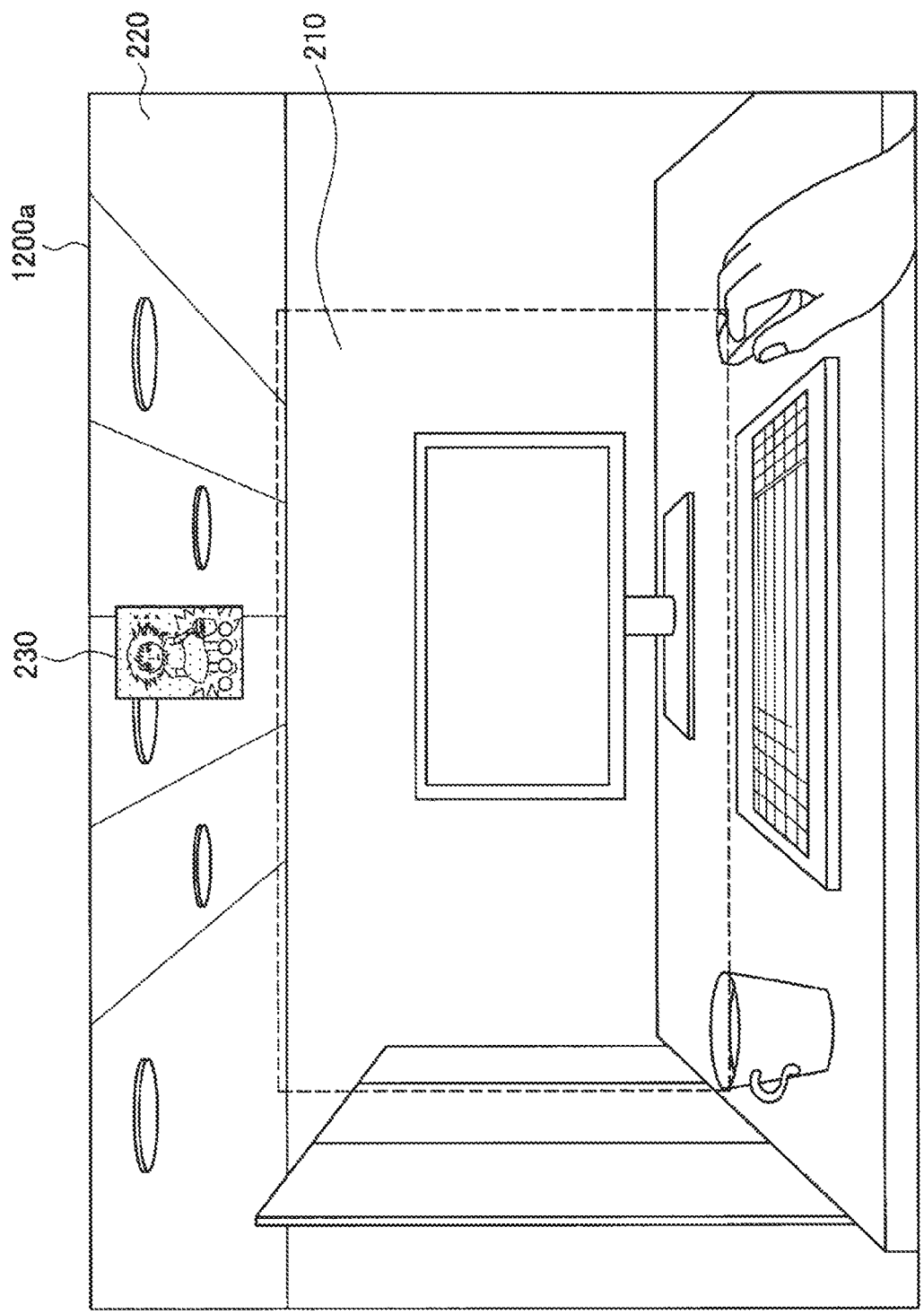
FIG. 7 is a diagram to describe virtual object display control according to the embodiment.
Figure 8:
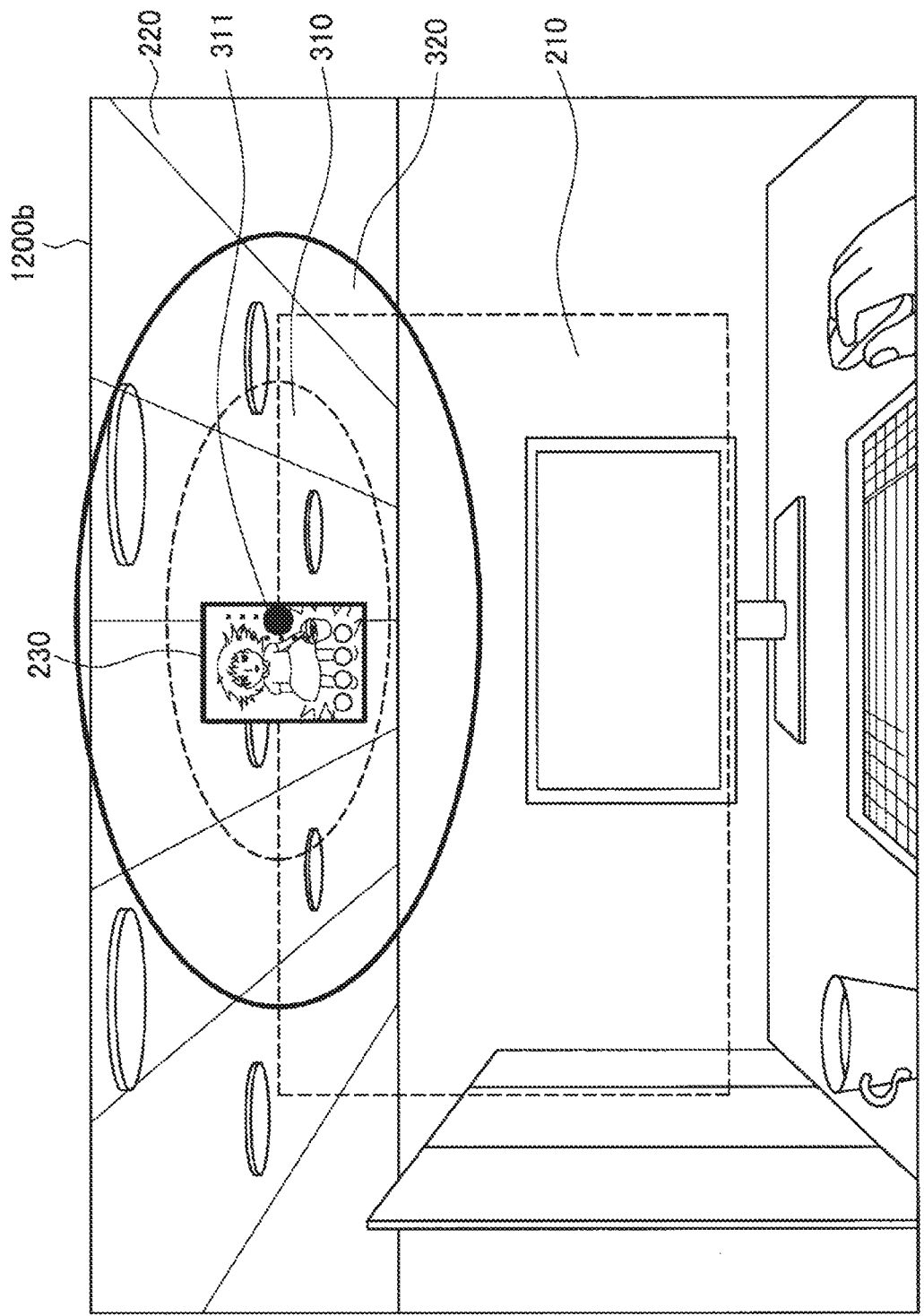
FIG. 8 is a diagram to describe the virtual object display control according to the embodiment.

The information presentation controller 103 controls the position in which a virtual object is displayed according to each region that is set as described above. FIGS. 7 and 8 are diagrams to describe virtual object display control according to the embodiment. As illustrated in FIG. 7, for example, the information presentation controller 103 displays a virtual object 230 that is notification information (including recommendation information) to the user, such as a movie advertisement, on the head orientation peripheral region 220 on a display screen 1200. When the eyeballs of the user face front and the area of the head orientation peripheral region 220 is set at an area that coincides with the gaze direction peripheral region 320, the example illustrated in FIG. 7 can be described as one where the virtual object 230 is displayed in the gaze direction peripheral region 320 (the peripheral vision). Displaying a virtual object on the peripheral region first of all as described above makes it possible to make subtle information presentation without hindering viewability to the user.

As illustrated in FIG. 8, when the gaze of the user is turned to the virtual object 230, that is, when the position of the point of regard 311 based on the gaze direction is within the display region of the virtual object 230, the information presentation controller 103 determines that the user is slightly conscious of the presence of the virtual object 230 and performs display control to enhance the display of the virtual object 230. The enhanced display achieves an effect that an attention of the user is drawn and serves as feedback of a choosing operation.

For example, the information presentation controller 103 increases the display size of the virtual object 230, applies an animation in which the virtual object 230 swings, changes the color, or makes the color clear (adjusts the contrast). The virtual object 230 is made clear relatively on the display screen by making the region excluding the virtual object 230 darker slightly. The information presentation controller 103 may make a perceptional representation excluding display output by making sounds, causing the information processing apparatus 10 to vibrate, or the like.

The position of display of the virtual object 230 may be associated with a three-dimensional position in the real space (or a two-dimensional position on the display screen). This allows the user to see the virtual object 230 as if the virtual object 230 is present actually in the real space. For example, in the example illustrated in FIG. 7, the virtual object 230 is positioned above a PC (real object) that is present in front of the user (the position is, as described above, determined based on the head orientation peripheral region 220).

In such a case, when the user notices the virtual object 230 and shifts the gaze up and more or less turns the face to the virtual object 230, as illustrated in FIG. 8, the display viewing angle of the display unit 120 with optical transmissivity shifts upward. The position of display of the virtual object 230 is associated with the real space and thus, when the user turns the face to the virtual object 230, as illustrated in FIG. 8, the position of display of the virtual object 230 may be within the head orientation central region 210.

As described, when the gaze as well as the face is turned to the virtual object 230 that is displayed in the head orientation peripheral region 220 and accordingly the position of display of the virtual object 230 overlaps the head orientation central region 210 and the gaze direction central region 310, the information presentation controller 103 according to the embodiment is able to determine that the user is interested in the virtual object 230 and needs more information. In this case, the information presentation controller 103 represents, around the virtual object 230, detailed information of the virtual object 230 representing simplified information or switches the virtual object 230 representing the simplified information to a detailed display. Accordingly, in the embodiment, it is possible to improve usability in information presentation.

2-3. Display Unit 120

The display unit 120 has optical transmissivity and is implemented using, for example, a lens unit that makes a display using a hologram optical technology, a liquid crystal display (LCD;) device, an OLDE (Organic Light Emitting Diode) device, or the like. The display unit 120 may be transmissive, semi-transmissive, or untransmissive. The optical transmissivity of the display unit 120 may be controlled by the controller 100.

2-4. Speaker 130

The speaker 130 reproduces an audio signal according to control by the controller 100.

2-5. Communication Unit 140

The communication unit 140 is a communication module for wired or wireless data communication with other devices. The communication unit 140 performs wireless communication with an external device directly or via a network access point by, for example, a system of a wired LAN (Local Area Network), a wireless LAN, Wi-Fi (Wireless Fidelity, trademark), infrared communication, Bluetooth (trademark), near-field or non-contact communication, or the like.

2-6. Operational Input Unit 150

The operational input unit 150 is implemented with an operational member having a physical structure, such as a switch, a button, or a lever.

2-7. Storage 160

The storage 160 is implemented with a ROM (Read Only Memory) that stores programs and arithmetic operation parameters that are used for the process performed by the controller 100 described above and a RAM (Random Access Memory) that temporarily stores parameters that vary as appropriate, etc. The storage 160 according to the embodiment may store, for example, information that is presented by the information presentation controller 103 (data on the virtual object).

The configuration of the information processing apparatus 10 according to the embodiment has been described specifically; however, the configuration of the information processing apparatus 10 according to the embodiment is not limited to the example illustrated in FIG. 2. For example, the information processing apparatus 10 may be formed of multiple devices. Specifically, for example, the information processing apparatus 10 according to the embodiment may have a system configuration formed of the HMD that is worn by the user and a smartphone. In this case, for example, the smartphone may be provided with the function of the controller 100 and the HMD performs information presentation according to the control of the smartphone.

At least part of the sensor unit 110 may be an external sensor (for example, an environmental sensor, such as a camera, a depth sensor, a mic, an infrared sensor or an ultrasound sensor).

At least part of the function of the controller 100 of the information processing apparatus 10 may exist in another device with which a communication connection is made via the communication unit 140. For example, at least part of the function of the controller 100 of the information processing apparatus 10 may be provided in an intermediate server or a cloud server on the Internet. Alternatively, a configuration in which the level of the processing performed by the controller 100 is made easy and advanced processing is performed by an external device, for example, by another mobile device, such as a smartphone owned by the user, a home server, an edger server, an intermediate server, or a cloud server, may be employed. Dispersing the process into multiple devices reduces the load.

Information that is presented by the information presentation controller 103 (data on a virtual object) may be acquired from an external device (for example, a server on a network) via the communication unit 140.

The functional configuration of the information processing apparatus 10 according to the embodiment can be modified flexibly according to the mode or operation.

3. Operational Process

A Display control process performed by the information processing apparatus 10 according to the embodiment will be described in detail below with reference to the drawings.

3-1. Display Control Process

Figure 9:
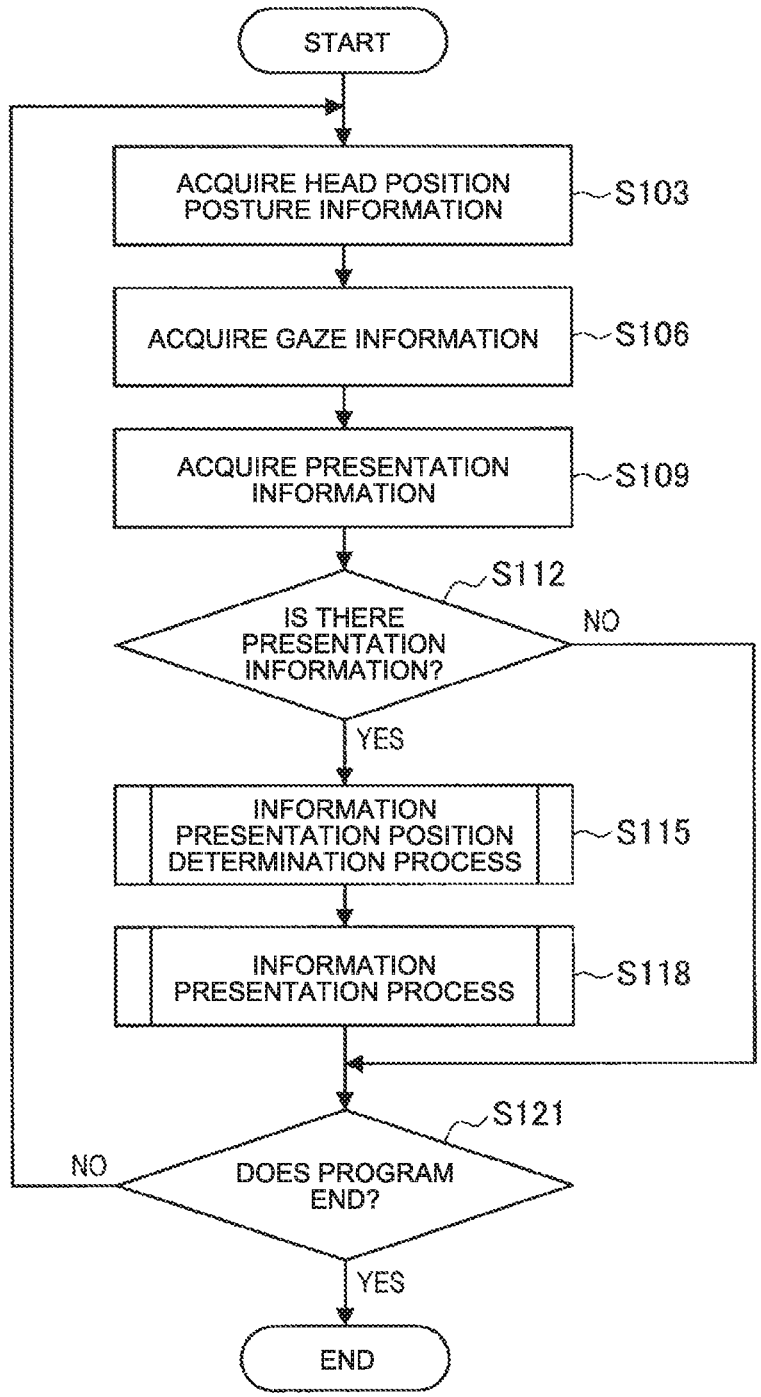
FIG. 9 is a flowchart representing an example of a flow of a display control process performed by the information processing apparatus according to the embodiment.

FIG. 9 is a flowchart representing an example of a flow of the display control process performed by the information processing apparatus 10 according to the embodiment.

As illustrated in FIG. 9, first of all, the head position posture recognition unit 101 of the information processing apparatus 10 acquires information on the position and posture of the head of the user based on various types of information that are sensed by the sensor unit 110 (step S103).

The gaze recognition unit 102 of the information processing apparatus 10 then acquires information on a line of sight of the user based on various types of sensor information that are sensed by the sensor unit 110 (step S106).

The information presentation controller 103 of the information processing apparatus 10 then acquires presentation information (step S109). For example, the information presentation controller 103 estimates a subject of interest of the user (a real object or a virtual object) based on gaze information on the user and acquires information on the subject of interest from the storage 160 or the outside. Alternatively, various sets of notification information dependent on an application that is provided by the information processing apparatus 10 (such as new arrival notification, recommendation information, news, or a notice) may be acquired. For example, it may be a mail receipt notification, or the like.

Figure 10:
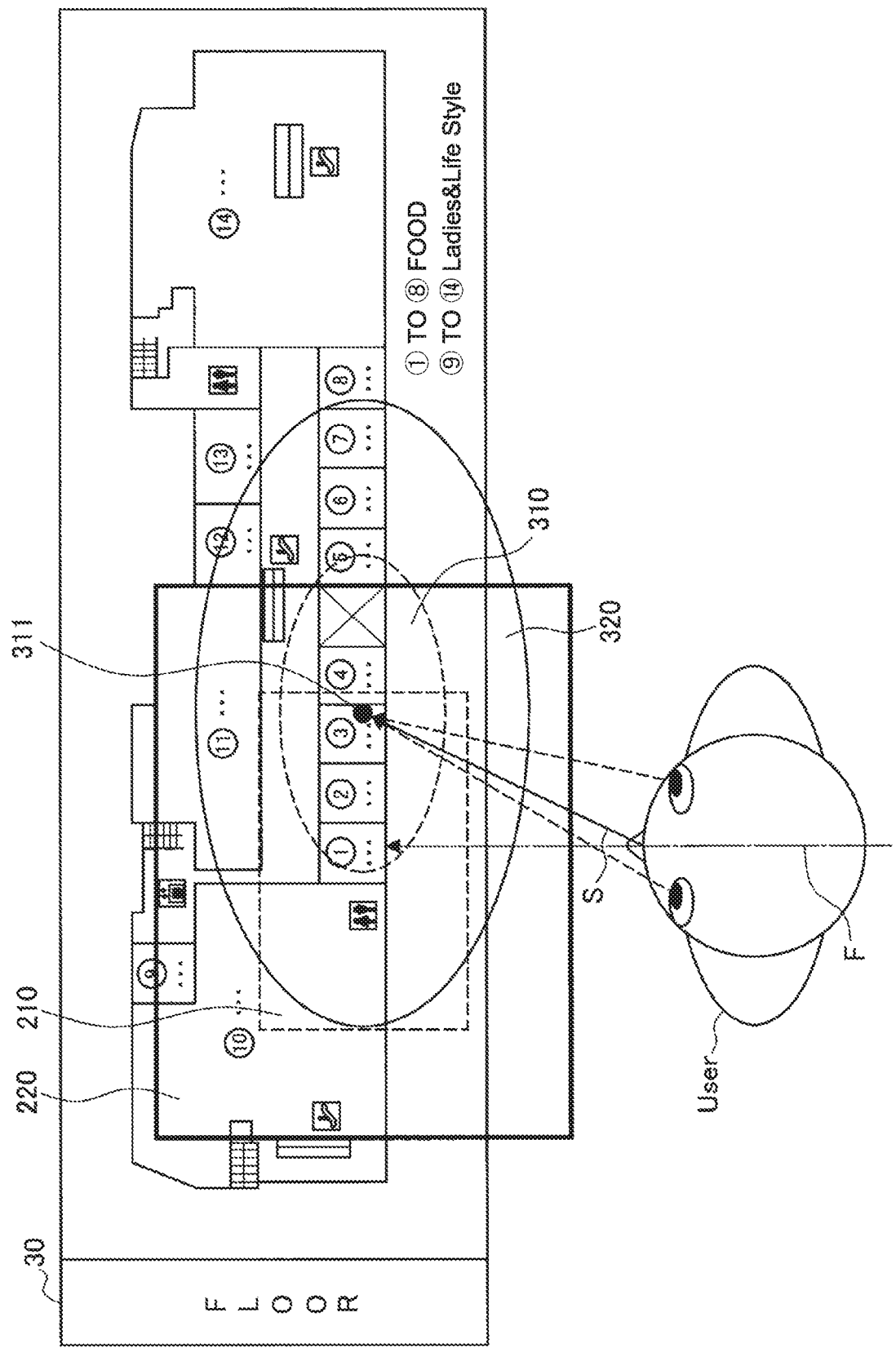
FIG. 10 is a diagram to describe estimating a subject of interest of a user according to the embodiment.

With reference to FIG. 10, estimating a subject of interest of a user will be described with reference to FIG. 10. In the example illustrated in FIG. 10, when the user is, for example, looking at a floor map 30 (a real object), which spot on the floor map 30 the user is interested in is estimated based on a gaze direction of the user. Specifically, based on a captured image that is captured by the outward camera 111 (in FIG. 10, to simplify the illustration, the information processing apparatus 10 that the user wears on the head is not illustrated) and the gaze direction of the user that is recognized by the gaze recognition unit 102, the information presentation controller 103 estimates that a subject that the user is looking at, that is, the subject in which the point of regard 311 is positioned is the subject of interest (candidate). In the example illustrated in FIG. 10, because the user is looking at the shop No. 3 among the shops that are arranged on the floor map 30, the information presentation controller 103 estimates that the shop No. 3 is the current subject of interest (candidate).

The information presentation controller 103 acquires information on the shop No. 3 from the storage 160 or the outside. In an example of the acquisition from the outside, for example, the information presentation controller 103 may receive floor map information that is transmitted (for example, broadcasted) from a peripheral communication terminal that is set by the facility by Bluetooth, or the like, or acquire floor map information on the network based on identifying information on the floor map 30 that is acquired by some method (for example, a QR code presented on the floor map 30 is read).

As illustrated in FIG. 10, the information presentation controller 103 may detect the head orientation central region 210, the head orientation peripheral region 220, the gaze direction central region 310, and the gaze direction peripheral region 320 based on the captured image that is captured by the outward camera 111, the head orientation F that is recognized by the head position posture recognition unit 101, and the gaze direction S that is recognized by the gaze recognition unit 102.

Estimating a subject of interest has been described with reference to FIG. 10. The subject of interest is a real object herein; however, the embodiment is not limited to this, and the subject of interest may be a virtual object (see FIG. 7).

When there is presentation information (that is, when relative information on the subject can be acquired) (step S112/Yes), the information presentation controller 103 performs an information presentation position determination process (step S115). The information presentation controller 103 determines a position in which information (a virtual object) is presented based on the gaze information (containing the gaze direction) and the head position posture information (containing the head orientation). Details of the information presentation position determination process will be described below with reference to FIG. 11.

Subsequently, the information presentation controller 103 performs a process of presenting given information (a virtual object) in the determined position (step S118). The information presentation controller 103 can control presentation information stepwise and dynamically according to a shift in gaze and a move of the head. Details will be described below with reference to FIG. 13.

The process represented in steps S103 to S118 described above is repeated until the program ends (step S121). As the case where the program ends, the case where the user performs a process of explicitly stopping the information presentation process or the power of the information processing apparatus 10 is turned off, or the like, is assumed.

The example of the operational process according to the embodiment has been described. The operational process illustrated in FIG. 9 is an example and the disclosure is not limited to the example illustrated in FIG. 9. For example, the disclosure is not limited to the order of steps illustrated in FIG. 9. At least any steps may be processed in parallel or may be processed in an inverse order. For example, the process of steps S103 to S112 may be processed in parallel or may be processed in a different order. Furthermore, the whole process illustrated in FIG. 9 need not be performed in a single device.

3-2. Information Presentation Position Determination Process

Figure 11:
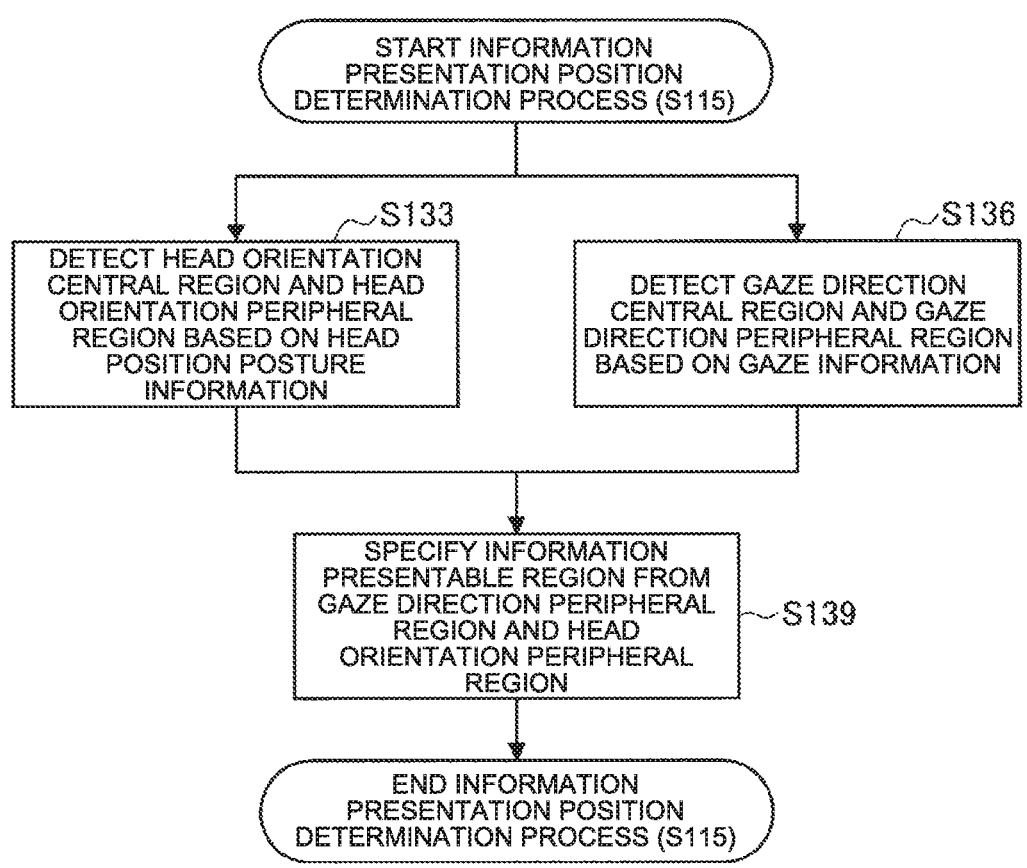
FIG. 11 is a flowchart representing an example of an information presentation position determination process according to the embodiment.

With reference to FIG. 11, the information presentation position determination process represented in step S115 described above will be described. FIG. 11 is a flowchart representing an example of the information presentation position determination process according to the embodiment.

As represented in FIG. 11, first of all, based on the head position posture information that is acquired by the head position posture recognition unit 101, the information presentation controller 103 detects the head orientation central region 210 and the head orientation peripheral region 220 (step S133).

Based on gaze information that is acquired by the gaze recognition unit 102, the information presentation controller 103 then detects the gaze direction central region 310 and the gaze direction peripheral region 320 (step S136).

The information presentation controller 103 specifies an information presentable region 400 from the gaze direction peripheral region 320 and the head orientation peripheral region 220 (step S139). Here, FIG. 12 represents a diagram to describe specifying an information presentable region according to the embodiment.

Figure 12:
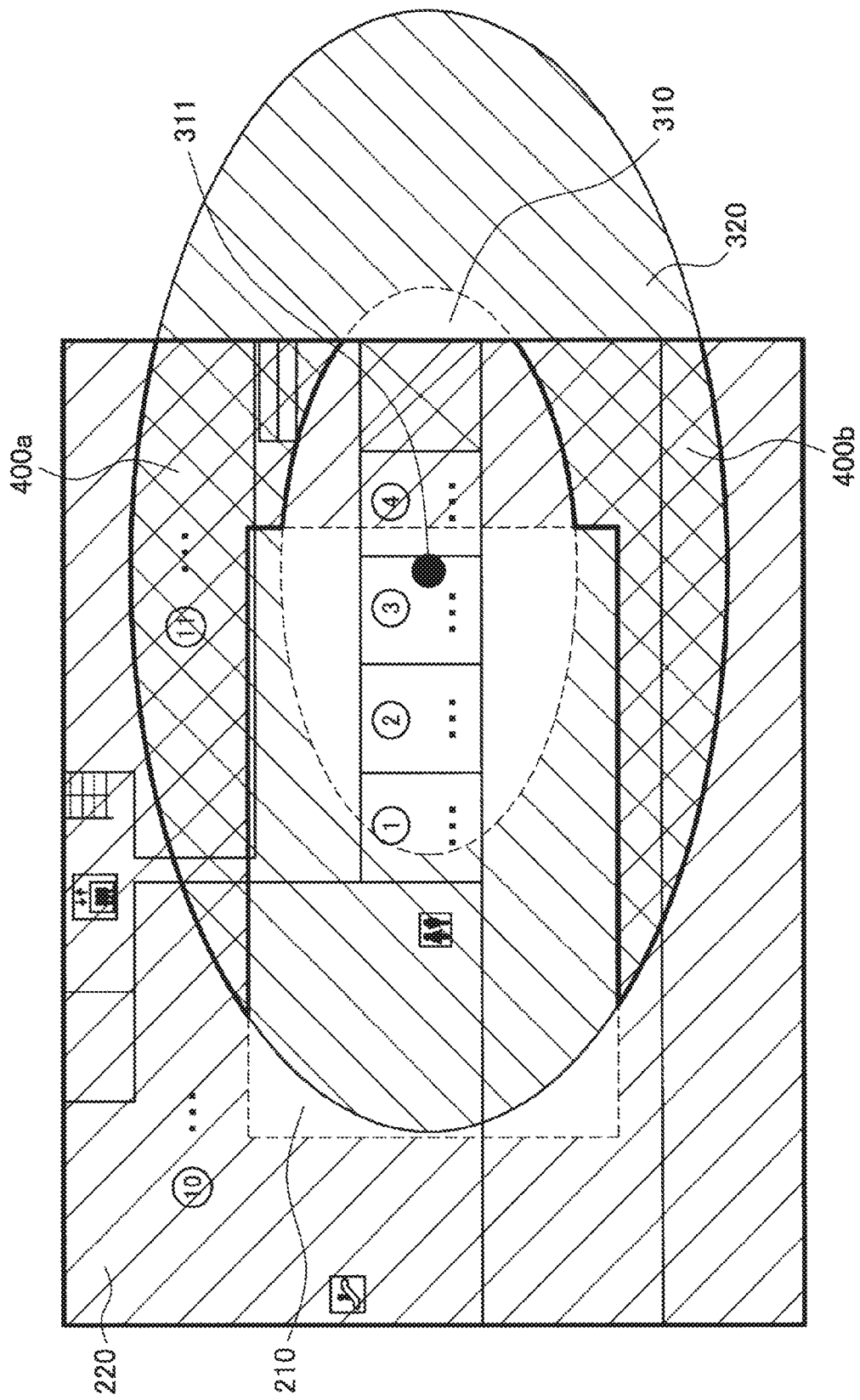
FIG. 12 is a diagram to describe specifying an information presentable region according to the embodiment.

As illustrated in FIG. 12, when the head orientation central region 210, the head orientation peripheral region 220, the gaze direction central region 310, and the gaze direction peripheral region 320 are detected, for example, the information presentation controller 103 specifies the region where the gaze direction peripheral region 320 and the head orientation peripheral region 220 overlap as the information presentable region 400 (400a, 400b). The information presentable region 400 may include multiple information presentable regions. When the information presentable region 400 includes multiple information presentable regions, the information presentation controller 103 may determine a priority on which one of the information presentable regions 400 a display is made from, for example, the positional relationship with the head of the user, the head orientation, and the positional relationship with the background, etc. For example, when the information presentable regions 400 are present in the upper area and the lower area, one close to the head may be prioritized, or one with less other objects (real objects or virtual objects) present in the peripheral area or background may be prioritized. In the example illustrated in FIG. 12, the information presentable region 400a is detected in an upper area and the information presentable region 400b is detected in a lower area but the information presentation controller 103 avoids the information presentable region 400a that overlaps the floor map 30 and determines the information presentable region 400b with no other object that is likely to be a subject of interest on the background.

The area of the information presentable region 400 is an area where, as described above, the gaze direction peripheral region 320 and the head orientation peripheral region 220 overlap and, as for the distance (distance from the user), a position that the user can see easily may be determined, for example, according to the display size and the amount of information of information to be presented. When the information processing apparatus 10 is a HMD, a recommended minimum presentation distance is set and the determination may be determined in consideration of the recommended minimum presentation distance.

3-3. Information Presentation Process

Figure 13:
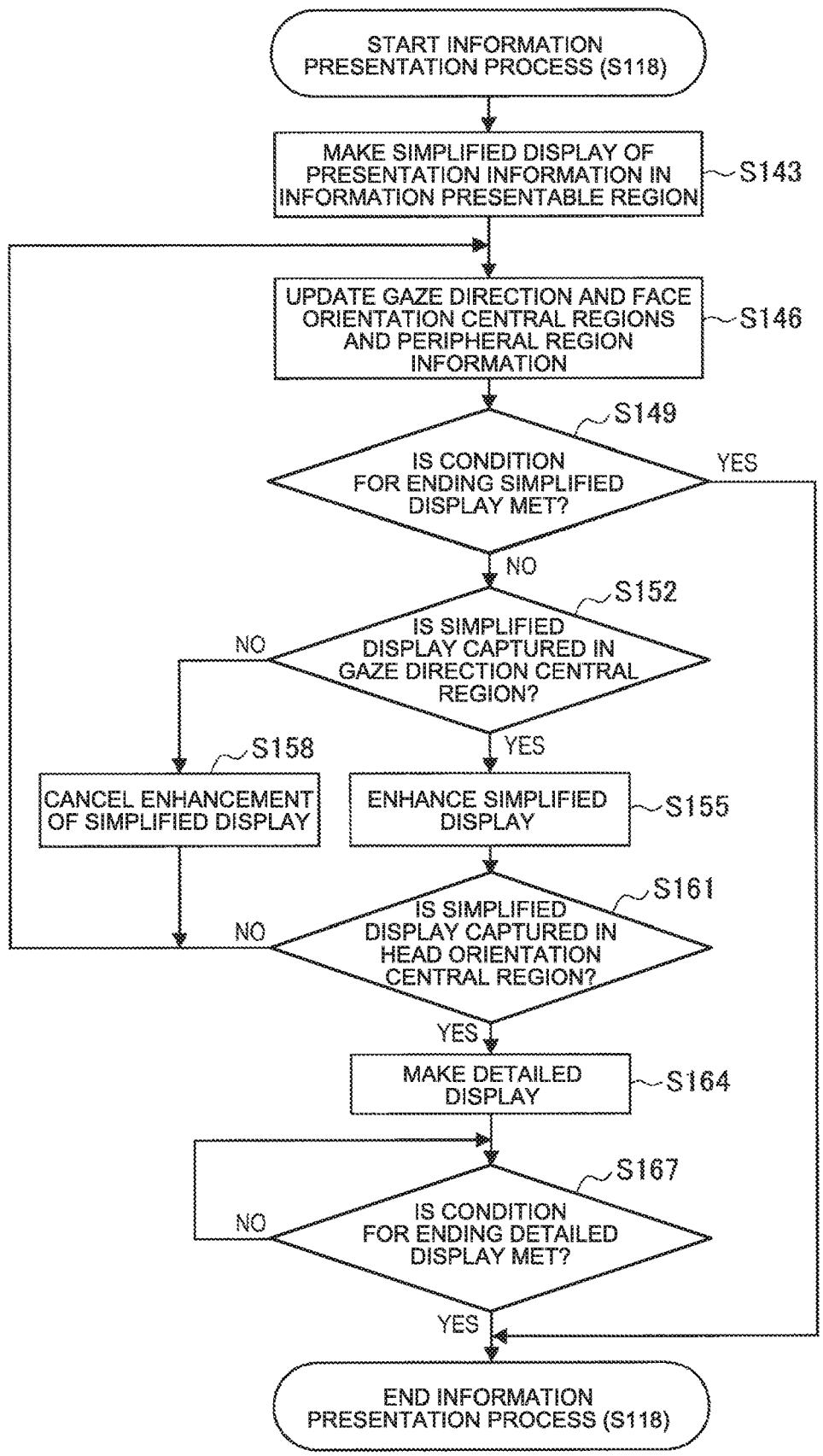
FIG. 13 is a flowchart representing an example of an information presentation process according to the embodiment.

With reference to FIG. 13, the information presentation process represented in step S118 described above will be described. FIG. 13 is a flowchart representing an example of the information presentation process according to the embodiment.

Figure 14:
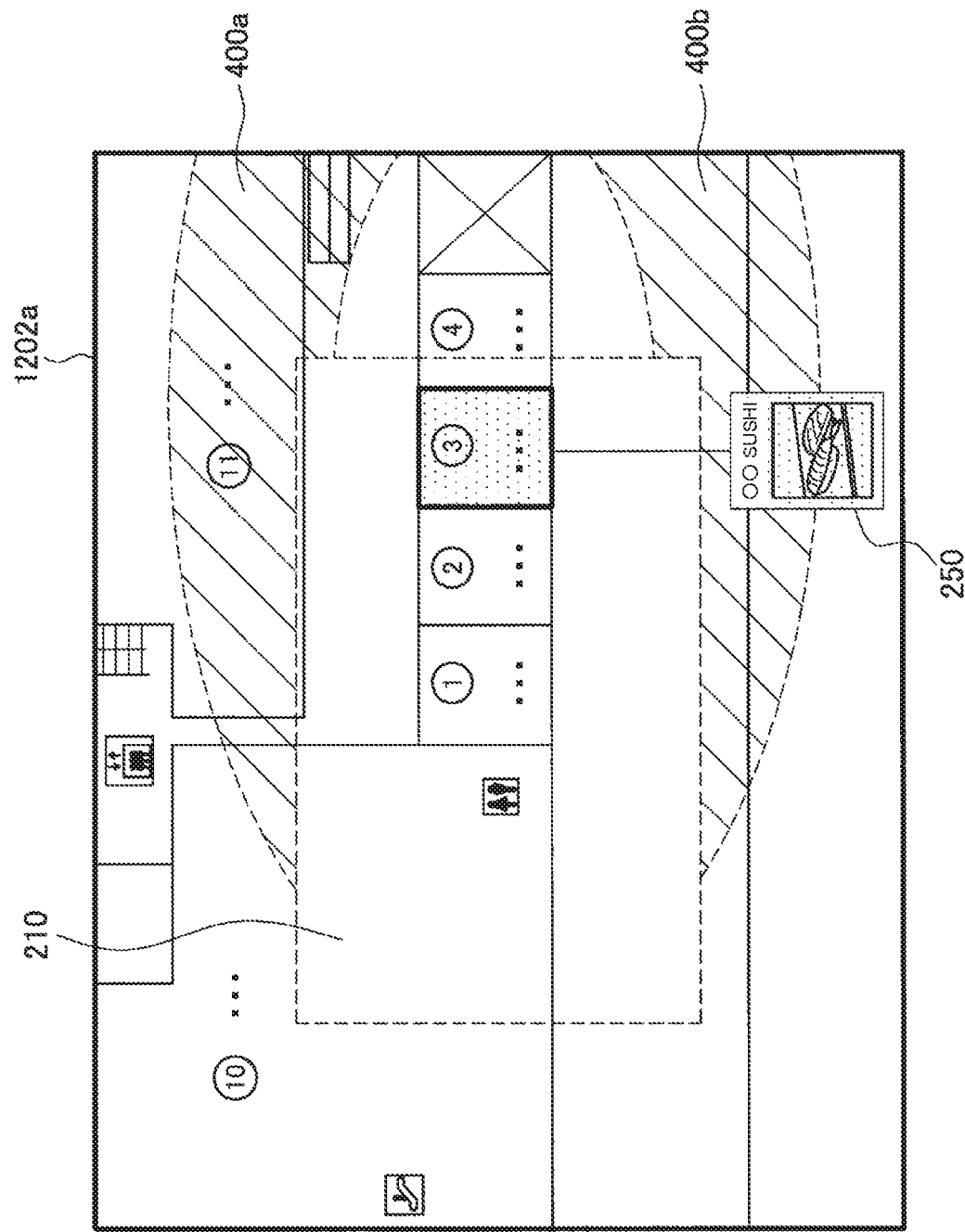
FIG. 14 is a diagram illustrating an example of simplified display of presentation information on the information presentable region according to the embodiment.

As illustrated in FIG. 13, first of all, the information presentation controller 103 makes a simplified display of presentation information (information on the above-described subject on which it is estimated that the subject is a subject of interest) (step S143). FIG. 14 illustrates an example of the simplified display according to the embodiment. As illustrated in FIG. 14, for example, the information presentation controller 103 displays a thumbnail (a virtual object 250) of the shop No. 3 that is a subject of interest according to the estimation in the map on a display screen 1202a. At that time, the information presentation controller 103 makes a presentation such that the simplified display is not contained in the head orientation central region 210. The head orientation central region 210 is a central region in front of the user and based on the head orientation F (the central region of the field of view of the user facing the front), and it is also assumed that the user returns the gaze soon. There is a risk that, at the stage where whether the user is actually interested is uncertain, the user feel that presentation of information in the head orientation central region 210 is bothersome and therefore making a display avoiding the head orientation central region 210 is useful.

The information presentation controller 103 may display a virtual object that colors a region on which it is estimated that the region is a subject of interest (the region of the shop No. 3 in the map) or fames the region. The information presentation controller 103 may display a virtual object that associates the region on which it is estimated that the region is a subject of interest and the simplified display (the virtual object 250) that is presented in the information presentable region 400.

As other variations of the simplified display, for example, a small-size display (a display size of the simplified display may be determined according to the size of the presentable region or the distance to the head orientation central region), a display with the amount of information being reduced (information that is understandable even in a small volume, such as a thumbnail, is left), presentation at a low brightness, presentation at a high transmissivity, and presentation of a movie by frame-by-frame advance are taken.

The information processing apparatus 10 updates the central regions and the peripheral regions in the gaze direction and the head orientation of the user (step S146). Detection of the central regions and the peripheral regions in the gaze direction and the head orientation may be performed constantly or may be performed again when a change occurs in the display (here, the timing when the simplified display is made).

The information presentation controller 103 the determines whether a condition for ending the simplified display is met based on a shift in gaze and a move of the head (step S149). As the condition for ending the simplified display, for example, the following conditions are taken.

When a simplified display is not viewed for a certain time (Note that, while the gaze is shifting to a subject that relates to the simplified display, the end determination may be false and an exceptional process may be performed. For example, the simplified display is not made disappear while the subject of interest from which the simplified display originates (in the example illustrated in FIG. 14, the region of the shop No. 3 in the map) is being gazed.)

When the user views once but is not interested and shifts the gaze

When the user leaves the site

When the interest of the user shifts to another subject (Note that, while the gaze is shifting to the subject that relates to the simplified display, the end determination may be false and an exceptional process may be performed (here, for convenience, a subject of gaze serves as a subject of interest). For example, while the user is gazing the subject from which the simplified display originates, the simplified display may be not made disappear. When multiple simplified displays are presented, while one of the simplified displays is being gazed, the simplified displays other than the subject of gaze may be evacuated to the gaze direction peripheral region. During a gaze on similar subjects that is determined as "comparison", the simplified displays other than the subjects of gaze may be evacuated to the gaze direction peripheral region. "Comparison" refers to, for example, comparing multiple shops while choosing a lunch using a restaurant guide or comparing products in different colors during shopping. When the user is handling an interrupt process, the end determination may be false and the above-described exceptional process may be performed. Handing an interrupt process is, for example, the case where a notification comes in a smartphone of the user and the gaze is turned to the smartphone, the case where the user is talked to by a friend and turns to the friend, or the case where a loud noise is made and the user turns in a direction from which the sound is made to check whether the user is not in danger.

When an explicit cancel operation is made by speaking, or the like.

Figure 15:
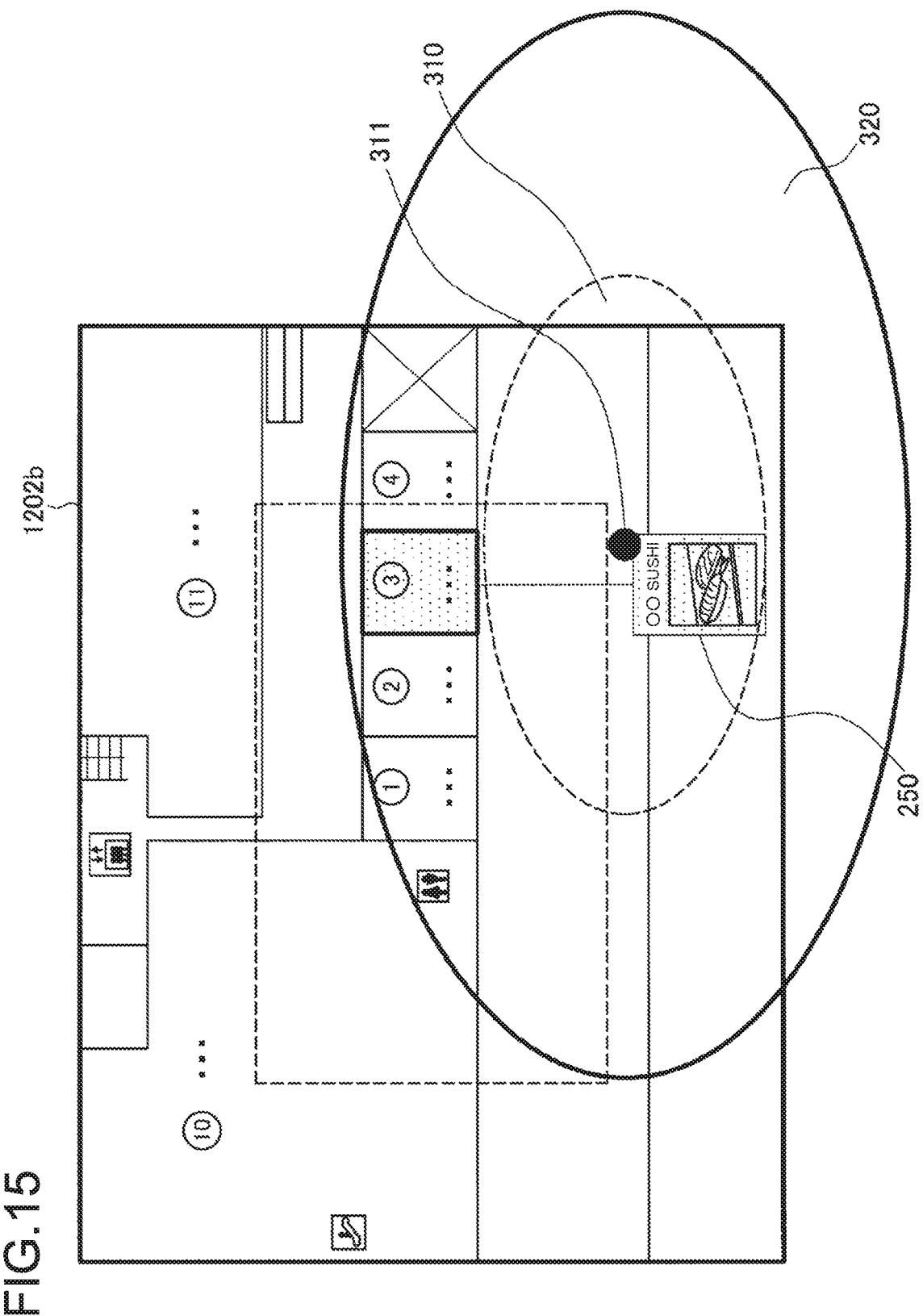
FIG. 15 is a diagram to describe the case where a simplified display is captured in a gaze direction center region according to the embodiment.

When the condition for ending the simplified display is not met (step S149/No), the information presentation controller 103 determines whether the user captures the simplified display in the gaze direction central region (step S152). For example, as illustrated in FIG. 15, when the point of regard 311 shifts toward the virtual object 250 in the simplified display and the virtual object 250 in the simplified display is positioned in the gaze direction central region 310, the information presentation controller determines that the virtual object 250 is captured in the gaze direction central region 310.

Figure 16:
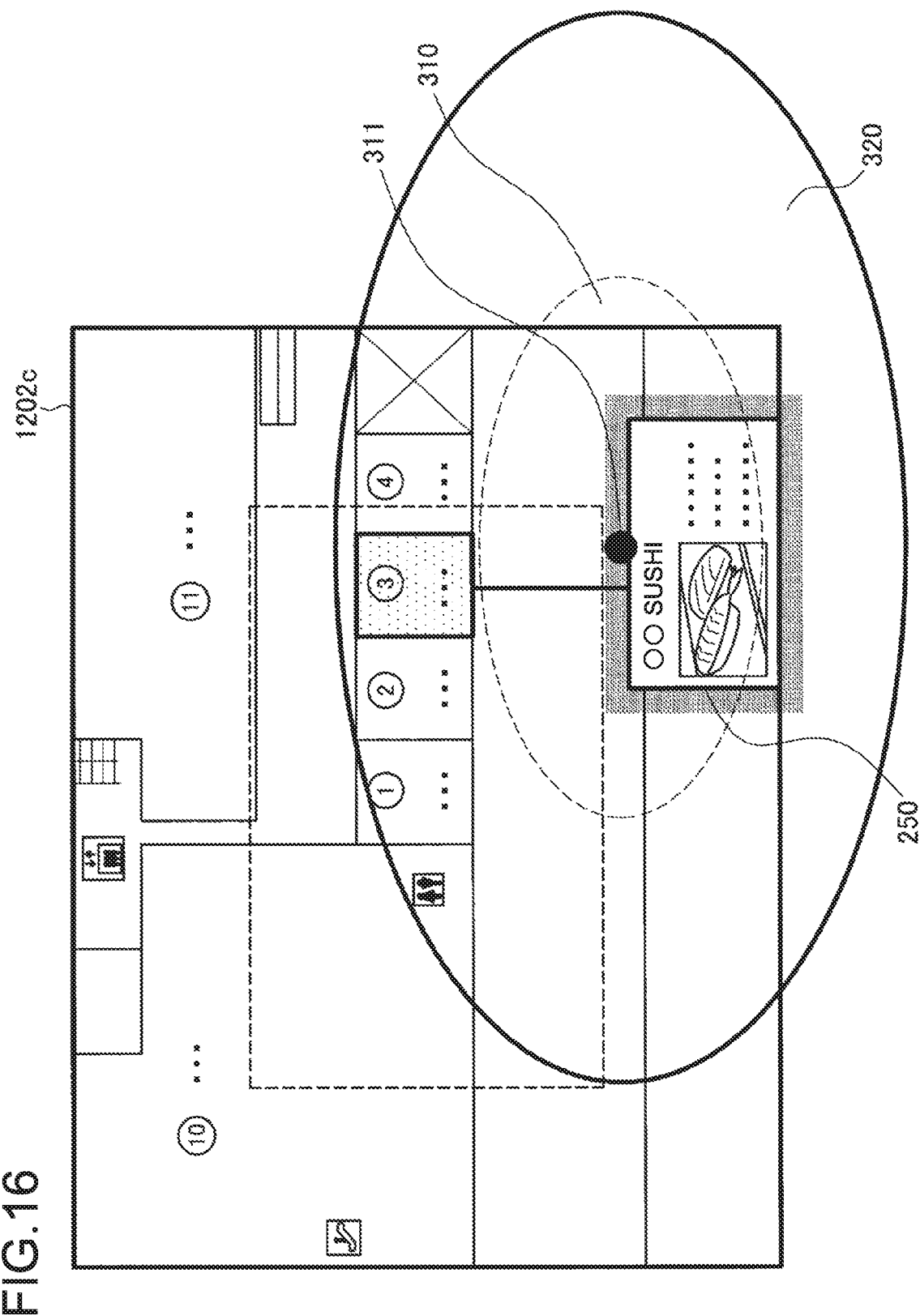
FIG. 16 is a diagram illustrating an example of enhanced display control on a simplified display according to the embodiment.

When the user captures the simplified display in the gaze direction central region (step S152/Yes), the information presentation controller 103 performs display control to enhance the simplified display (step S155). FIG. 16 is a diagram illustrating an example of enhanced display control on a simplified display. As illustrated in FIG. 16, display control is performed to further appeal to the user by, in the virtual object 250 in the simplified display that is displayed on a display screen 1202c, enlarging the thumbnail, coloring the background, adding little information, or the like.

Such enhanced display control need not necessarily be performed but it is expected that this further appeals to the user. The example has been described with reference to FIG. 16, and the followings are exemplified as the enhanced display control.

Increasing the display size (The display size may be determined according to the size of the presentable region or the distance to the head orientation central region.)

Increasing the volume of information

Increasing brightness

Lowering transmissivity

Presenting a movie by preview

Shifting the representation position close to the user

On the other hand, in the case where the user does not capture the simplified display in the gaze direction central region (step S152/No), when the simplified display is already enhanced, the information presentation controller 103 cancels the enhanced display control (step S155).

The information presentation controller 103 then determines whether the user captures the simplified display in the head orientation central region (step S161).

When the simplified display is captured in the head orientation central region (step S161/Yes), the information presentation controller 103 makes a detailed display (detailed content display control) (step S164). In the embodiment, when the simplified display is captured in the head orientation central region, that is, after the user turns the gaze to the simplified display and checks the simplified display and thereafter further turns the head (face), it is determined that the user is really interested in the simplified display and a display of the detailed information is made. As described above, estimating an interest of the user according to a shift in gaze and a move of the head increases accuracy in estimating an interest and furthermore performing stepwise display control on the display mode and information granularity in which a simplified display is made at first and then a detailed display is made when it is determined that the user is interested makes it possible to further improve usability in information presentation.

Figure 17:
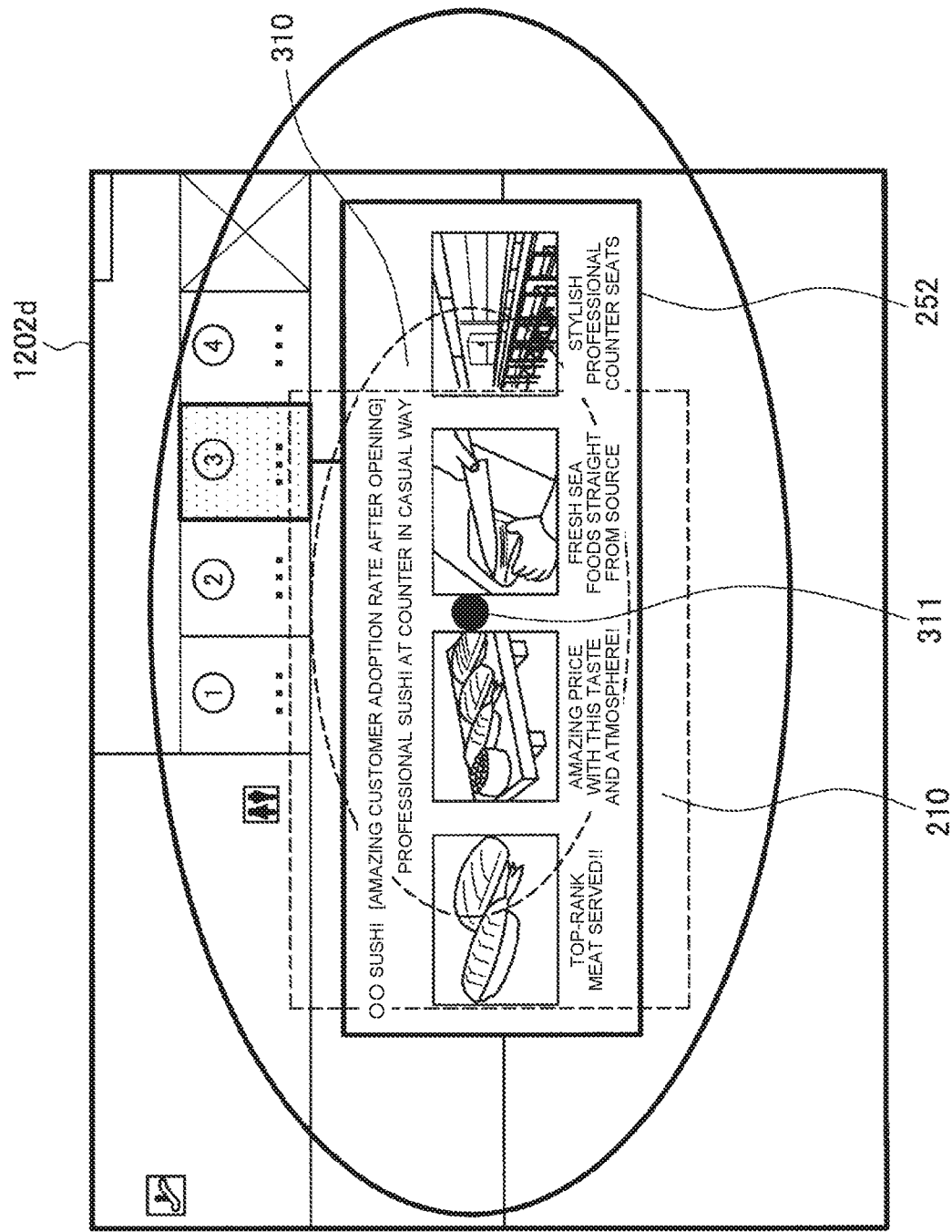
FIG. 17 is a diagram illustrating an example of a detailed display according to the embodiment.

FIG. 17 illustrates an example of the detailed display. A display screen 1202d illustrated in FIG. 17 is in a state where the user gazes the virtual object 250 illustrated in FIG. 16 and further turns the head toward the virtual object 250. In this case, the virtual object 250 is positioned in the head orientation central region 210. At that time, the information presentation controller 103 determines that it is the timing when the user is certainly interested and performs control to display, as illustrated in FIG. 17, a virtual object 252 obtained by switching the simplified display to the detailed display. Accordingly, it is possible to present detailed information on a subject in which the user is interested at appropriate timing.

The followings are taken as examples of the detailed display.

Reproducing a movie
Increasing the volume of information
Presenting in a large scale
Presenting at a high luminance
Presenting at a low transmissivity The information presentation controller 103 determines whether a condition for ending the detailed display is met and maintains the detailed display until the condition for ending the detailed display is met (step S167).

For example, the following conditions are taken as the condition for ending the detailed display.

When a detailed display is not viewed for a certain time (Note that while the gaze is shifting to a subject that relates to the detailed display, the end determination may be false and an exceptional process may be performed. For example, the detailed display is not made disappear while the subject of interest from which the detailed display originates is being gazed.)
When the user views once but is not interested and shifts the gaze
When the user leaves the site
When the interest of the user shifts to another subject (Note that, while the gaze is shifting to the subject that relates to the detailed display, the end determination may be false and an exceptional process may be performed (here, for convenience, a subject of gaze serves as a subject of interest). For example, while the user is gazing the subject from which the detailed display originates, the detailed display may be not made disappear. When multiple detailed displays are presented, while one of the detailed displays is being gazed, the detailed displays other than the subject of gaze may be evacuated to the gaze direction peripheral region. During a gaze on similar subjects that is determined as "comparison", the detailed displays other than the subjects of gaze may be evacuated to the gaze direction peripheral region. When the user is handling an interrupt process, the end determination may be false and the above-described exceptional process may be performed.

When an explicit cancel operation is made by speaking, or the like.

Figure 18:
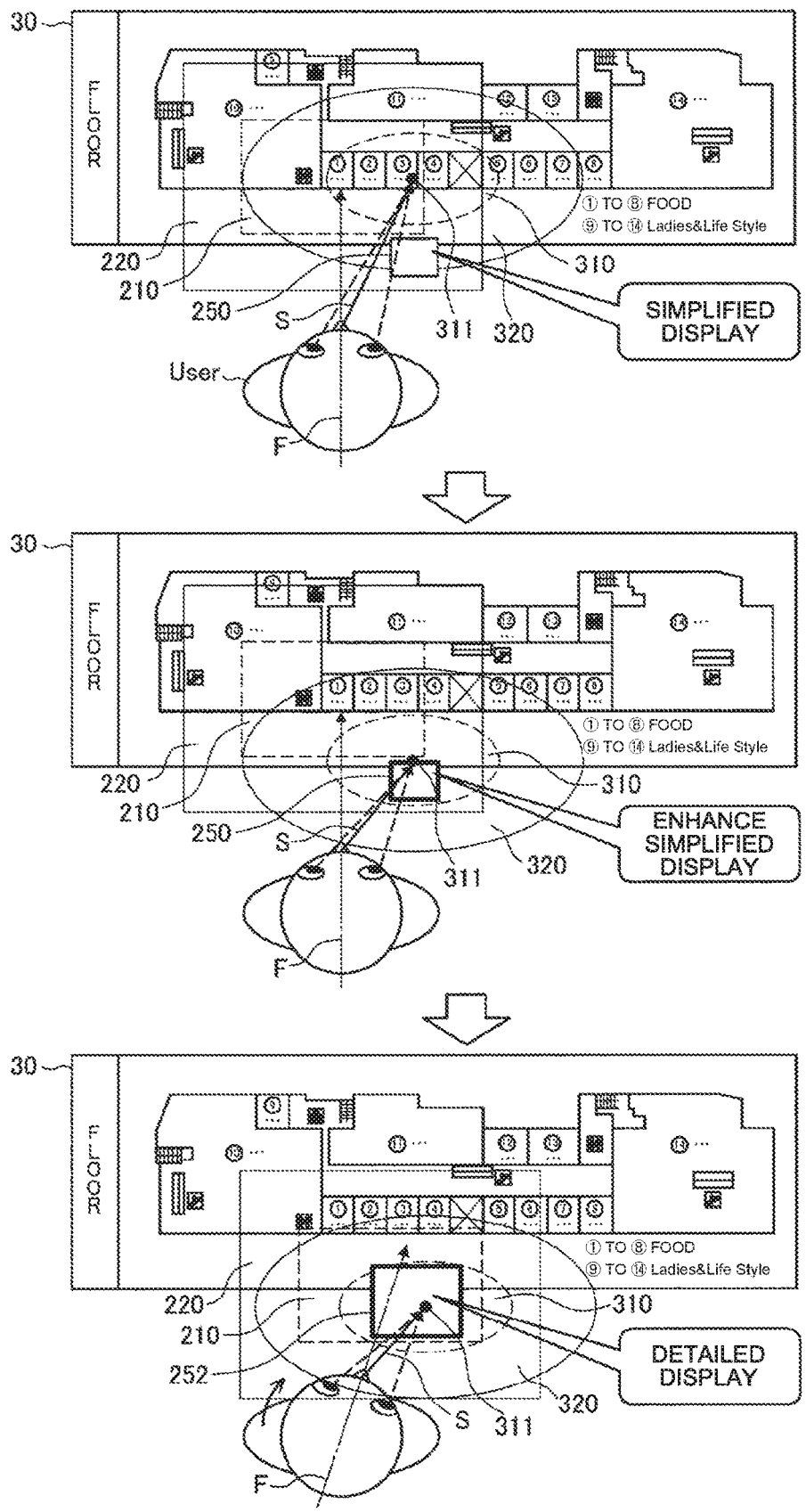
FIG. 18 is overhead views of stepwise display control according to the embodiment.

The details of the information presentation process according to the embodiment has been described. Overhead views of the stepwise display control according to the embodiment are represented in FIG. 18. As illustrated in the upper view in FIG. 18, first of all, the information presentation controller 103 estimates a subject of interest based on the point of regard 311 from a light of site (gaze direction S) of the user who is looking the floor map 30 and displays a simplified display of relative information (the virtual object 250) in a region where the gaze direction peripheral region 320 and the head orientation peripheral region 220 overlap (information presentable region).

Subsequently, as illustrated in the intermediate view in FIG. 18, when the gaze of the user is turned to the simplified display (the virtual object 250) (that is, when the virtual object 250 is captured in the gaze direction central region 310), the information presentation controller 103 performs display control to enhance the simplified display.

Subsequently, as illustrated in the lower view in FIG. 18, when the head of the user is turned to the simplified display (the virtual object 250) (that is, when the virtual object 250 is captured in the head orientation central region 210), the information presentation controller 103 performs control to display a detailed display (the virtual object 252).

Supplement

Figure 19:
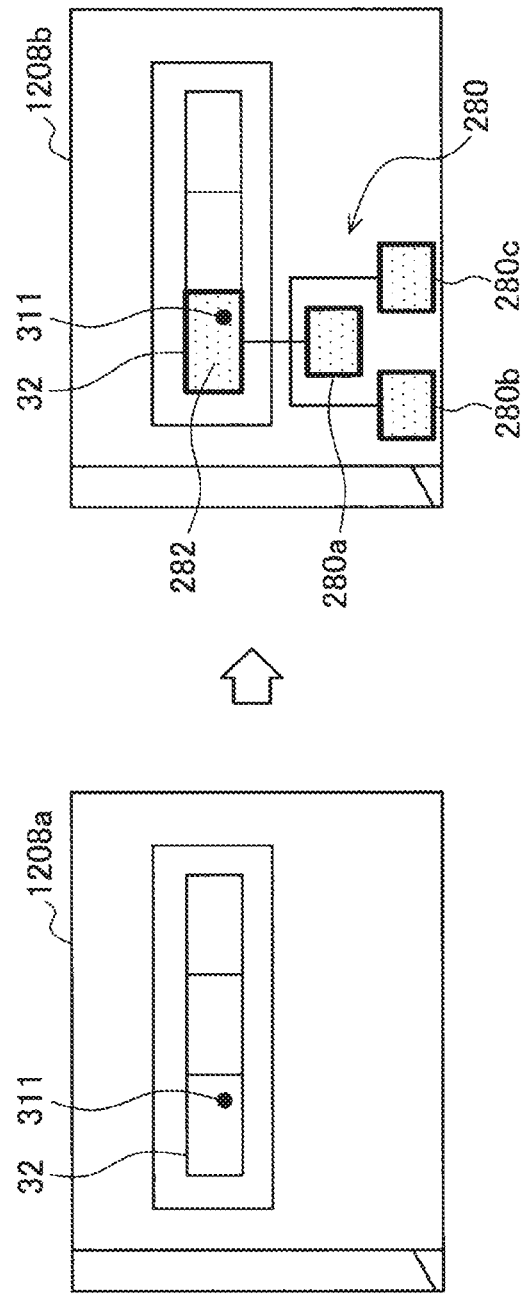
FIG. 19 is a diagram to describe another example of the stepwise display control according to the embodiment.
Figure 20:
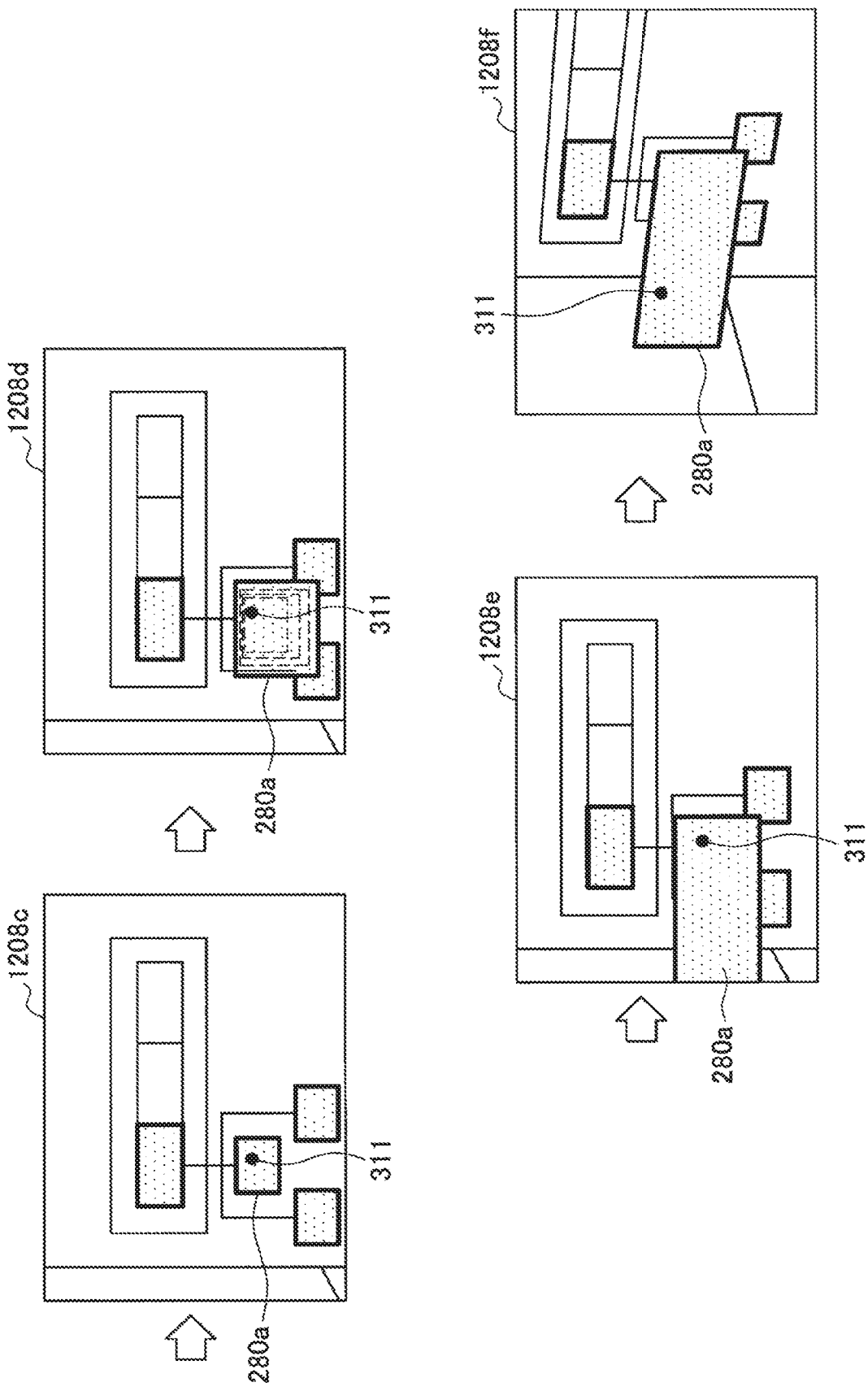
FIG. 20 is a diagram to describe another example of the stepwise display control according to the embodiment.

Information presentation control according to a shift in gaze and a move of the head of the user performed when multiple simplified displays are presented will be described with reference to FIGS. 19 and 20. FIGS. 19 and 20 are diagrams to describe other examples of the stepwise display control according to the embodiment.

As illustrated in a display screen 1208a, the information presentation controller 103 can estimate a subject of interest from the point of regard 311 based on the gaze direction of the user and, for example, when a real object 32 is specified, acquire relative information on the real object 32 and make multiple simplified displays (virtual objects 280a and 280b) as illustrated in a display screen 1208b in FIG. 19. At that time, the information presentation controller 103 may display a virtual object 282 that colors on the specified real object 32 in a superimposed manner.

Subsequently, as illustrated in a display screen 1208c in FIG. 20, when the user is gazing one of the virtual objects 280a and 280b in simplified displays according to the gaze direction of the user, the information presentation controller 103 makes an enhanced display of the virtual object 280a that the user is gazing (for example, the virtual object 280a gets close to the user) to further appeal to the user as illustrated in a display screen 1208d. As for other virtual objects 280b and 280c, the brightness may be lowered, the size may be reduced, or the virtual objects may be evacuated to the gaze direction peripheral region.

When the user turns the head toward the virtual object 280a and the virtual object 280a is contained in the head orientation central region, the information presentation controller 103 performs control to display the virtual object 280a obtained by switching to the detailed display (for example, the volume of information is increased) as illustrated in a display screen 1208e. When the virtual object 280a is not within the display screen, as illustrated in a display screen 1208f in FIG. 20, the user shifts the gaze or moves the head and thus is able to view the virtual object 280a. Display control may be performed such that the position of display and the posture of the virtual object are associated with a three-dimensional position in the real space such that the virtual object looks as if the virtual object exists actually in the real space.

4. Modification

In the above-described example, the stepwise display control on information on a real object that exists in a real space has been described; however, the embodiment is not limited to this. For example, display control may be performed stepwise on a notification from a system, etc., using a virtual object. A flow of performing display control stepwise on a notification from a system, or the like, using a virtual object. A flow of stepwise display control on a notification from the system, or the like, is the same as that in FIG. 13 and the details are thus omitted herein and, with reference to FIGS. 21 to 24, transition of the display screen according to a shift in gaze and a move of the head of the user will be described. A mail receipt notification is used as an example of the notification from the system, or the like.

FIG. 21 is a diagram illustrating an example of a simplified display of a mail receipt notification (a virtual object 270). As illustrated in a display screen 1204a in FIG. 21, first of all, when a mail receipt notification is acquired from an application or a system, the information presentation controller 103 may, as in the case described with reference to FIG. 14, specify the information presentable region 400 from the gaze direction peripheral region 320 and the head orientation peripheral region 220 based on the gaze direction and the head orientation of the user and displays a simplified display (the virtual object 270) of the mail receipt notification on the information presentable region 400. At that time, the information presentation controller 103 may make the simplified display be not contained in the head orientation central region 210 because of the same reason as that described above.

Subsequently, as illustrated in a display screen 1204b in FIG. 22, the information presentation controller 103 determines whether a simplified display (the virtual object 270) is captured in the gaze direction central region 310. When the simplified display (the virtual object 270) is captured in the gaze direction central region 310, an enhanced display of the simplified display (the virtual object 270) is made as illustrated in a display screen 1204c in FIG. 23.

When the user moves the head and captures the simplified display (the virtual object 270) in the head orientation central region 210 (that is, when at least part or all the simplified display is contained in the head orientation central region 210), the information presentation controller 103 makes a detailed display of the mail receipt notification (display of a mail body) as illustrated in a display screen 1204d in FIG. 24.

Supplementary 1

When the user turns the gaze to a real object that is positioned in the head orientation peripheral region, the information processing apparatus 10 according to the embodiment may make a simplified display of information on the real object and, when the head is further moved and the simplified display is positioned in the head orientation central region, make a detailed display.

Supplementary 2

When a specific gesture (nodding, inclining the head, or the like) is detected based on a move of the head after the gaze is turned to the simplified display, the information processing apparatus 10 may determine that the user indicates an explicit intension and exceptionally perform corresponding appropriate display control. When it is estimated that the user is not interested from the head gesture or when the user nods (a gesture indicating that "I understand"), for example, from the head gesture, information presentation may end.

5. Summary

As described above, the information processing apparatus 10 according to the embodiment of the disclosure makes it possible to improve usability in information presentation.

The preferable embodiments of the disclosure have been described in detail with reference to the accompanying drawings; however, the present technique is not limited to the examples. It is obvious that those with general knowledge in the technical field of the disclosure can reach various modification examples or correction examples within the scope of the technical idea described in the claims and it is understood that they naturally belong to the technical scope of the disclosure.

It is possible to create a computer program for causing hardware, such as a CPU, a ROM, or a RAM, that is incorporated in the information processing apparatus 10 to implement the function of the information processing apparatus 10. Furthermore, a computer-readable recording medium in which the computer program is stored is also provided.

The information processing apparatus 10 according to the embodiment is not limited to AR display control using a glasses-type wearable terminal (transmissive HMD) described with reference to FIG. 1 and, for example, it is possible to apply the information processing apparatus 10 to, for example, display control in a display device, such as a smartphone or a tablet terminal device. As the scene of use, for example, the case where a smartphone is placed near the user but the user is looking another site (operates a PC or watches a TV) is assumed. In this case, the gaze direction and the head orientation of the user may be detected with a camera or an external sensor that is provided in the smartphone (for example, a camera or a gaze sensor that is provided in glasses that the user wears, a room, a PC or a TV). Control is performed such that, a gaze of the user at the time when notification information, such as a mail receipt notification, is displayed on the smartphone is detected and, when the gaze is turned to the smartphone, an enhanced display of the notification information is made and, when the head is also turned to the smartphone, a detailed display is made.

Furthermore, information presentation according to the embodiment may be performed by projection with a projector. Based on a gaze direction and a head orientation of the user that are detected by an external sensor, etc., the information processing apparatus 10 performs control such that a simplified display of notification information on a real object on which it is estimated that the real object is a subject of interest or notification information that is acquired from an application is projected onto an information presentable region in which a gaze direction peripheral region and a head orientation peripheral region of the user overlap. When the gaze of the user is turned to the simplified display, the information processing apparatus 10 performs display control to enhance the simplified display and, when the head is further turned, performs display control to make a detailed display.

The effect described herein is only descriptive and exemplary and is not restrictive. In other words, the technique according to the embodiment can implement, together with, or instead of the above-described effect, another effect that is obvious to those skilled in the art from the description herein.

The technique may employ the following configuration.

(1)
An information processing apparatus comprising:
a recognition unit configured to recognize a shift in gaze and a move of a head of a user; and
a display controller configured to control display of information on a subject according to the move of the head that is made after the gaze is turned to the subject.

(2)
The information processing apparatus according to (1), wherein the display controller is configured to perform display control stepwise on a display mode and information granularity of the information on the subject according to a change in the shift in gaze and the move of the head with respect to the subject.

(3)
The information processing apparatus according to (1) or (2), wherein the subject is a real object or a virtual object, and
the display controller is configured to, when the subject is the virtual object, control a position of display of the virtual object based on a direction of the gaze and an orientation of the head.

(4)
The information processing apparatus according to (3), wherein the virtual object is notification information, and
the display controller is configured to make a simplified display of the notification information in a gaze direction peripheral region that is a peripheral region of a region based on the direction of the gaze and a head orientation peripheral region that is a peripheral region of an area based on the orientation of the head.

(5)
The information processing apparatus according to (3), wherein the real object is a subject of interest on which it is estimated that the user is interested in the subject of interest, and
the display controller is configured to
estimate that a real object that is positioned in a gaze direction central region that is a central region of a region based on the direction of the gaze is the subject of interest, and
make a simplified display of information on the subject of interest in a head orientation peripheral region that is a peripheral region of a region based on the orientation of the head and a gaze direction peripheral region that is a peripheral region of a region based on the direction of the gaze.

(6)
The information processing apparatus according to (4) or (5), wherein the display controller is configured to determine whether a condition for ending the simplified display is met based on at least any one of the shift in gaze and the move of the head and, when the condition for ending the simplified display is met, end the simplified display.

(7)
The information processing apparatus according to (6), wherein the condition for ending the simplified display is based on whether the gaze is on the simplified display for a certain time.

(8)
The information processing apparatus according to (7), wherein the display controller is configured to end the simplified display when the gaze is turned to the simplified display but the gaze shifts before the certain time elapses.

(9)
The information processing apparatus according to any one of (4) to (8), wherein the display controller performs display control to enhance the simplified display when the simplified display is positioned in a gaze direction central region that is a central region of a region based on the direction of the gaze and a certain time elapses.

(10)
The information processing apparatus according to any one of (4) to (9), wherein the display controller is configured to switch the simplified display to a detailed display when the head is turned to the simplified display and the simplified display is positioned in a gaze direction central region that is a central region in the region based on the direction of the gaze and in a head orientation central region that is a central region of the region based on the orientation of the head.

(11)
The information processing apparatus according to (10), wherein the display controller is configured to determine whether a condition for ending the detailed display is met based on at least any one of the shift in gaze and the move of the head and, when the condition for ending the detailed display is met, end the detailed display.

(12)
The information processing apparatus according to (11), wherein the condition for ending the detailed display is based on whether the gaze is on the detailed display for a certain time.

(13)
The information processing apparatus according to (12), wherein the display controller is configured to end the detailed display when the gaze shifts from the detailed display before the certain time elapses.

(14)
The information processing apparatus according to any one of (1) to (13), wherein the recognition unit is configured to recognize the shift in gaze based on a move of an eye of the user.

(15)
An information processing method comprising:
by a processor,
recognizing a shift in gaze and a move of a head of a user, and
controlling display of information on a subject according to the move of the head that is made after the gaze is turned to the subject.

(16)
A program for causing a computer to function as
a recognition unit configured to recognize a shift in gaze and a move of a head of a user, and a display controller configured to control display of information on a subject according to the move of the head that is made after the gaze is turned to the subject.

REFERENCE SIGNS LIST

10 INFORMATION PROCESSING APPARATUS
100 CONTROLLER
101 HEAD POSITION ORIENTATION RECOGNITION UNIT
102 GAZE RECOGNITION UNIT
103 INFORMATION PRESENTATION CONTROLLER
110 SENSOR UNIT
111 OUTWARD CAMERA
112 GAZE SENSOR
113 MIC
114 GYRO SENSOR
115 ACCELERATION SENSOR
116 ORIENTATION SENSOR
117 POSITION SENSOR
120 DISPLAY UNIT
130 SPEAKER
140 COMMUNICATION UNIT
150 OPERATIONAL INPUT UNIT
160 STORAGE

The invention claimed is:

1. An information processing apparatus comprising:
a recognition unit configured to recognize a shift in gaze and a move of a head of a user; and
a display controller configured to
control display of information on a subject according to the move of the head that is made after the gaze is turned to the subject, and
make a simplified display of information on the subject in a head orientation peripheral region and a gaze direction peripheral region, based on the head orientation peripheral region overlapping with the gaze direction peripheral region,
wherein the head orientation peripheral region is peripheral to a region set based on an orientation of the head,
wherein the gaze direction peripheral region is peripheral to another region set based on a direction of the gaze,
wherein a real object is a subject of interest on which it is estimated that the user is interested in the subject of interest,
wherein the display controller is further configured to
estimate that a real object that is positioned in a gaze direction central region that is a central region of a region based on the direction of the gaze is the subject of interest, and
make a simplified display of information on the subject of interest in the head orientation peripheral region based on the orientation of the head and the gaze direction peripheral region based on the direction of the gaze, and
wherein the recognition unit and the display controller are each implemented via at least one processor.

2. The information processing apparatus according to claim 1, wherein the display controller is further configured to perform display control stepwise on a display mode and information granularity of the information on the subject according to a change in the shift in gaze and move of the head with respect to the subject.

3. The information processing apparatus according to claim 1, wherein the subject is a real object or a virtual object, and
the display controller is further configured to, when the subject is the virtual object, control a position of display of the virtual object based on the direction of the gaze and the orientation of the head.

4. The information processing apparatus according to claim 3, wherein the virtual object is notification information, and
the display controller is further configured to make a simplified display of the notification information in the gaze direction peripheral region based on the direction of the gaze and the head orientation peripheral region based on the orientation of the head.

5. The information processing apparatus according to claim 3, wherein the real object is a subject of interest on which it is estimated that the user is interested in the subject of interest, and
the display controller is further configured to
estimate that a real object that is positioned in a gaze direction central region that is a central region of a region based on the direction of the gaze is the subject of interest, and
make a simplified display of information on the subject of interest in the head orientation peripheral region based on the orientation of the head and the gaze direction peripheral region based on the direction of the gaze.

6. The information processing apparatus according to claim 4, wherein the display controller is further configured to determine whether a condition for ending the simplified display is met based on at least any one of the shift in the gaze and the move of the head and, when the condition for ending the simplified display is met, end the simplified display.

7. The information processing apparatus according to claim 6, wherein the condition for ending the simplified display is based on whether the gaze is on the simplified display for a certain time.

8. The information processing apparatus according to claim 7, wherein the display controller is further configured to end the simplified display when the gaze is turned to the simplified display but the gaze shifts before the certain time elapses.

9. The information processing apparatus according to claim 4, wherein the display controller is further configured to perform display control to enhance the simplified display when the simplified display is positioned in a gaze direction central region that is a central region of a region based on the direction of the gaze and a certain time elapses.

10. The information processing apparatus according to claim 4, wherein the display controller is further configured to switch the simplified display to a detailed display when the head is turned to the simplified display and the simplified display is positioned in a gaze direction central region that is a central region in the region based on the direction of the gaze and in a head orientation central region that is a central region of the region based on the orientation of the head.

11. The information processing apparatus according to claim 10, wherein the display controller is further configured to determine whether a condition for ending the detailed display is met based on at least any one of the shift in gaze and the move of the head and, when the condition for ending the detailed display is met, end the detailed display.

12. The information processing apparatus according to claim 11, wherein the condition for ending the detailed display is based on whether the gaze is on the detailed display for a certain time.

13. The information processing apparatus according to claim 12, wherein the display controller is further configured to end the detailed display when the gaze shifts from the detailed display before the certain time elapses.

14. The information processing apparatus according to claim 1, wherein the recognition unit is further configured to recognize the shift in gaze based on a move of an eye of the user.

15. An information processing method comprising:
by a processor,
recognizing a shift in gaze and a move of a head of a user;
controlling display of information on a subject according to the move of the head that is made after the gaze is turned to the subject;
making a simplified display of information on the subject in a head orientation peripheral region and a gaze direction peripheral region, based on the head orientation peripheral region overlapping with the gaze direction peripheral region,
wherein the head orientation peripheral region is peripheral to a region set based on an orientation of the head,
wherein the gaze direction peripheral region is peripheral to another region set based on a direction of the gaze, and
wherein a real object is a subject of interest on which it is estimated that the user is interested in the subject of interest;
estimating that a real object that is positioned in a gaze direction central region that is a central region of a region based on the direction of the gaze is the subject of interest; and
making a simplified display of information on the subject of interest in the head orientation peripheral region based on the orientation of the head and the gaze direction peripheral region based on the direction of the gaze.

16. A non-transitory computer-readable medium having embodied thereon a program, which when executed by a computer causes the computer to execute an information processing method, the method comprising:
recognizing a shift in gaze and a move of a head of a user;
controlling display of information on a subject according to the move of the head that is made after the gaze is turned to the subject;
making a simplified display of information on the subject in a head orientation peripheral region and a gaze direction peripheral region, based on the head orientation peripheral region overlapping with the gaze direction peripheral region,
wherein the head orientation peripheral region is peripheral to a region set based on an orientation of the head,
wherein the gaze direction peripheral region is peripheral to another region set based on a direction of the gaze, and
wherein a real object is a subject of interest on which it is estimated that the user is interested in the subject of interest;
estimating that a real object that is positioned in a gaze direction central region that is a central region of a region based on the direction of the gaze is the subject of interest; and
making a simplified display of information on the subject of interest in the head orientation peripheral region based on the orientation of the head and the gaze direction peripheral region based on the direction of the gaze.

* * * * *